United States Patent
Nam et al.

(10) Patent No.: US 9,344,910 B2
(45) Date of Patent: *May 17, 2016

(54) SYSTEMS AND METHODS FOR TRANSMITTING CHANNEL QUALITY INFORMATION IN WIRELESS COMMUNICATION SYSTEMS

(71) Applicant: Samsung Electronics Co., Ltd., Suwon-si, Gyeonggi-do (KR)

(72) Inventors: Young-Han Nam, Plano, TX (US); Jianzhong Zhang, Plano, TX (US)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,099

(22) Filed: Jun. 9, 2014

(65) Prior Publication Data

US 2014/0321306 A1     Oct. 30, 2014

Related U.S. Application Data

(63) Continuation of application No. 12/945,585, filed on Nov. 12, 2010, now Pat. No. 8,824,384.

(60) Provisional application No. 61/284,155, filed on Dec. 14, 2009.

(51) Int. Cl.
*H04W 24/08* (2009.01)
*H04L 1/00* (2006.01)
(Continued)

(52) U.S. Cl.
CPC ............. *H04W 24/08* (2013.01); *H04L 1/0003* (2013.01); *H04L 1/0009* (2013.01);
(Continued)

(58) Field of Classification Search
CPC ... H04L 1/0003; H04L 1/0009; H04L 1/0031; H04L 5/0023; H04L 5/0048; H04L 5/0053; H04L 27/2613; H04L 27/2626; H04W 72/042
See application file for complete search history.

(56) References Cited

U.S. PATENT DOCUMENTS

2009/0086648 A1* 4/2009 Xu et al. .................... 370/252
2010/0046412 A1* 2/2010 Varadarajan ............ H04L 5/003 370/312

(Continued)

FOREIGN PATENT DOCUMENTS

| CN | 101534473 A | 9/2009 |
|---|---|---|
| WO | WO 2009/074880 A3 | 6/2009 |
| WO | WO 2011/08519 A1 | 1/2011 |

OTHER PUBLICATIONS

Translated Examination Report dated Aug. 25, 2014 in connection with Japanese Application No. 2013-255165, 5 pages.

(Continued)

*Primary Examiner* — Paul H Masur

(57) ABSTRACT

A base station in a wireless network a plurality of mobile stations transmits to a first mobile station downlink subframes. Each downlink subframe comprises a plurality of resource blocks and is associated with a subframe (SF) type that is determined according to whether a PDSCH region of a resource block in a downlink subframe includes at least one of: 1) a cell-specific reference signal (CRS) resource element and 2) a channel-state-information reference signal (CSI-RS) resource element. The base station receives from the first mobile station at least one of CQI, PMI, modulation scheme, and transport block size and interprets the received at least one of CQI, PMI, modulation scheme, and transport block size according to a default SF type used by the first mobile station to determine the at least one of CQI, PMI, modulation scheme, and transport block size.

36 Claims, 22 Drawing Sheets

(51) Int. Cl.
*H04L 5/00* (2006.01)
*H04L 27/26* (2006.01)
*H04W 72/04* (2009.01)

(52) U.S. Cl.
CPC .......... *H04L 1/0031* (2013.01); *H04L 5/0023* (2013.01); *H04L 5/0048* (2013.01); *H04L 5/0053* (2013.01); *H04L 27/2613* (2013.01); *H04L 27/2626* (2013.01); *H04W 72/042* (2013.01); *H04L 1/0026* (2013.01)

(56) References Cited

U.S. PATENT DOCUMENTS

| | | | |
|---|---|---|---|
| 2010/0202311 A1* | 8/2010 | Lunttila et al. | 370/252 |
| 2010/0238824 A1* | 9/2010 | Farajidana et al. | 370/252 |
| 2010/0254471 A1* | 10/2010 | Ko et al. | 375/260 |
| 2010/0272009 A1* | 10/2010 | Cheng et al. | 370/315 |
| 2010/0272032 A1* | 10/2010 | Sayana et al. | 370/329 |
| 2011/0149765 A1* | 6/2011 | Gorokhov et al. | 370/252 |
| 2011/0228718 A1* | 9/2011 | Noh | H04L 5/0051 370/312 |
| 2011/0275363 A1* | 11/2011 | Kwon | H04W 48/18 455/422.1 |
| 2012/0027120 A1* | 2/2012 | Noh et al. | 375/295 |
| 2012/0155561 A1* | 6/2012 | Seo et al. | 375/260 |

OTHER PUBLICATIONS

Chinese Office Action dated Jun. 4, 2014 in connection with Chinese Patent Application No. 2010800567981, 11 pages.
3GPP TSG-RAN WG1 #59bis; "Considerations on CSI RS design in LTE-A" R1-094941; Jeju, Korea; Nov. 9-13, 2009; 11 pages.

* cited by examiner

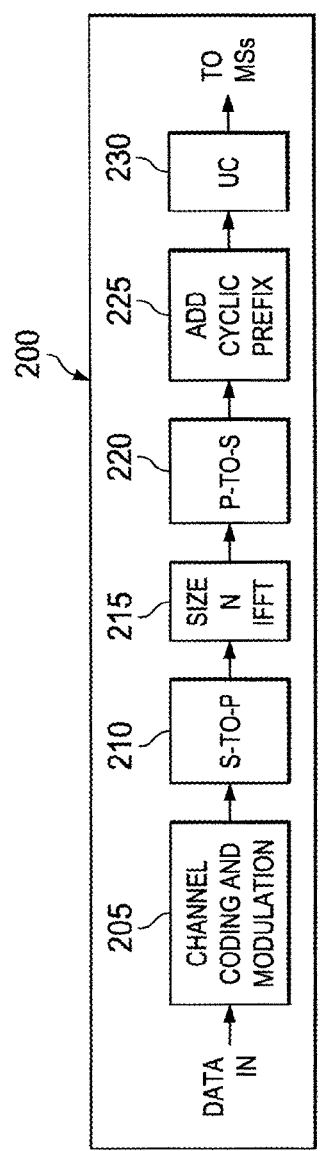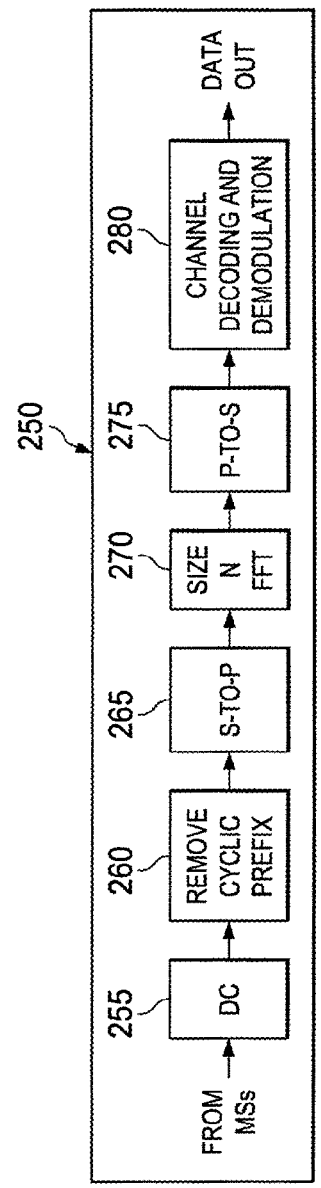
FIG. 2A
FIG. 2B

| SF0 (TYPE A) | SF1 (TYPE A) | SF2 (TYPE B) | SF3 (TYPE A) | SF4 (TYPE C) | SF5 (TYPE A) | SF6 (TYPE C) | SF7 (TYPE D) | SF8 (TYPE A) | SF9 (TYPE A) |

TYPE A: SF WITHOUT CSI RS AND WITH CRS IN PDSCH REGION
TYPE B: SF WITH CSI RS AND WITH CRS IN PDSCH REGION
TYPE C: SF WITHOUT CSI RS AND WITHOUT CRS IN PDSCH REGION
TYPE D: SF WITH CSI RS AND WITHOUT CRS IN PDSCH REGION

| | S0 | S1 | S2 | S3 | S4 | S5 | S6 | S0 | S1 | S2 | S3 | S4 | S5 | S6 |
|---|---|---|---|---|---|---|---|---|---|---|---|---|---|---|
| | | | A | A | A | DM-RS | DM-RS | A | A | A | A | A | DM-RS | DM-RS |
| | | | A | A | A | DM-RS | DM-RS | A | A | A | A | A | DM-RS | DM-RS |
| CRS P0 | | | A | A | A | D | D | A | A | A | A | A | D | D |
| | | | A | A | A | D | D | A | A | A | A | A | D | D |
| | | | A | A | A | D | D | A | A | A | A | A | D | D |
| CRS P1 | | | A | A | A | DM-RS | DM-RS | A | A | A | A | A | DM-RS | DM-RS |
| | | | A | A | A | DM-RS | DM-RS | A | A | A | A | A | DM-RS | DM-RS |
| | | | A | A | A | D | D | A | A | A | A | A | D | D |
| CRS P0 | | | A | A | A | D | D | A | A | A | A | A | D | D |
| | | | A | A | A | D | D | A | A | A | A | A | D | D |
| | | | A | A | A | DM-RS | DM-RS | A | A | A | A | A | DM-RS | DM-RS |
| CRS P1 | | | A | A | A | DM-RS | DM-RS | A | A | A | A | A | DM-RS | DM-RS |

| ←── EVEN-NUMBERED SLOTS ──→ | ←── ODD-NUMBERED SLOTS ──→ |

| | | | | | | | | | | | | | |
|---|---|---|---|---|---|---|---|---|---|---|---|---|---|
| | | | A | B | DM-RS | DM-RS | B | B | A | A | B | DM-RS | DM-RS |
| | | | A | B | DM-RS | DM-RS | B | B | A | A | B | DM-RS | DM-RS |
| CRS P0 | CRS P2 | | A | CRS P1 | D | D | CRS P0 | CRS P3 | A | A | CRS P1 | D | D |
| | | | A | B | D | D | B | B | A | A | B | D | D |
| | | | A | B | D | D | B | B | A | A | B | D | D |
| CRS P1 | CRS P3 | | A | CRS P0 | DM-RS | DM-RS | CRS P1 | CRS P2 | A | A | CRS P0 | DM-RS | DM-RS |
| | | | A | B | DM-RS | DM-RS | B | B | A | A | B | DM-RS | DM-RS |
| | | | A | B | D | D | B | B | A | A | B | D | D |
| CRS P0 | CRS P2 | | A | CRS P1 | D | D | CRS P0 | CRS P3 | A | A | CRS P1 | D | D |
| | | | A | B | D | D | B | B | A | A | B | D | D |
| | | | A | B | DM-RS | DM-RS | B | B | A | A | B | DM-RS | DM-RS |
| CRS P1 | CRS P3 | | A | CRS P0 | DM-RS | DM-RS | CRS P1 | CRS P2 | A | A | CRS P0 | DM-RS | DM-RS |
| S0 | S1 | S2 | S3 | S4 | S5 | S6 | S0 | S1 | S2 | S3 | S4 | S5 | S6 |

|←—— EVEN-NUMBERED SLOTS ——→|←—— ODD-NUMBERED SLOTS ——→|

FIG. 10A

|   |   |   | A | B | DM-RS | DM-RS | B | B | A | A | B | DM-RS | DM-RS |
|---|---|---|---|---|---|---|---|---|---|---|---|---|---|
|   |   |   | A | B | D | D | B | B | A | A | B | D | D |
| CRS P0 | CRS P2 |   | A | CRS P1 | D | D | CRS P0 | CRS P3 | A | A | CRS P1 | D | D |
|   |   |   | A | B | D | D | B | B | A | A | B | D | D |
|   |   |   | A | B | D | D | B | B | A | A | B | D | D |
| CRS P1 | CRS P3 |   | A | CRS P0 | DM-RS | DM-RS | CRS P1 | CRS P2 | A | A | CRS P0 | DM-RS | DM-RS |
|   |   |   | A | B | D | D | B | B | A | A | B | D | D |
|   |   |   | A | B | D | D | B | B | A | A | B | D | D |
| CRS P0 | CRS P2 |   | A | CRS P1 | D | D | CRS P0 | CRS P3 | A | A | CRS P1 | D | D |
|   |   |   | A | B | D | D | B | B | A | A | B | D | D |
|   |   |   | A | B | DM-RS | DM-RS | B | B | A | A | B | DM-RS | DM-RS |
| CRS P1 | CRS P3 |   | A | CRS P0 | D | D | CRS P1 | CRS P2 | A | A | CRS P0 | D | D |
| S0 | S1 | S2 | S3 | S4 | S5 | S6 | S0 | S1 | S2 | S3 | S4 | S5 | S6 |

EVEN-NUMBERED SLOTS | ODD-NUMBERED SLOTS

| | | | A | B | DM-RS | DM-RS | B | B | A | A | B | DM-RS | DM-RS |
|---|---|---|---|---|---|---|---|---|---|---|---|---|---|
| | | | A | B | A | A | B | B | A | A | B | A | A |
| CRS P0 | CRS P2 | | A | CRS P1 | A | A | CRS P0 | CRS P3 | A | A | CRS P1 | A | A |
| | | | A | B | A | A | B | B | A | A | B | A | A |
| | | | A | B | A | A | B | B | A | A | B | A | A |
| CRS P1 | CRS P3 | | A | CRS P0 | DM-RS | DM-RS | CRS P1 | CRS P2 | A | A | CRS P0 | DM-RS | DM-RS |
| | | | A | B | A | A | B | B | A | A | B | A | A |
| | | | A | B | A | A | B | B | A | A | B | A | A |
| CRS P0 | CRS P2 | | A | CRS P1 | A | A | CRS P0 | CRS P3 | A | A | CRS P1 | A | A |
| | | | A | B | A | A | B | B | A | A | B | A | A |
| | | | A | B | DM-RS | DM-RS | B | B | A | A | B | DM-RS | DM-RS |
| CRS P1 | CRS P3 | | A | CRS P0 | A | A | CRS P1 | CRS P2 | A | A | CRS P0 | A | A |
| S0 | S1 | S2 | S3 | S4 | S5 | S6 | S0 | S1 | S2 | S3 | S4 | S5 | S6 |
| EVEN-NUMBERED SLOTS | | | | | | | ODD-NUMBERED SLOTS | | | | | | |

FIG. 11

SYSTEMS AND METHODS FOR TRANSMITTING CHANNEL QUALITY INFORMATION IN WIRELESS COMMUNICATION SYSTEMS

CROSS-REFERENCE TO RELATED APPLICATION(S) AND CLAIM OF PRIORITY

The present application is a continuation of U.S. patent application Ser. No. 12/945,585, filed Nov. 12, 2010 and entitled "SYSTEMS AND METHODS FOR TRANSMITTING CHANNEL QUALITY INFORTION IN WIRELESS COMMUNICATION SYSTEMS," now U.S. Pat. No. 8,824,384, which claims priority to U.S. Provisional Patent Application No. 61/284,155, filed Dec. 14, 2009, entitled "METHODS AND APPARATUS FOR TRANSMITTING CHANNEL QUALITY INFORTION IN WIRELESS COMMUNICATION SYSTEMS." The contents of the above-identified patent documents are hereby incorporated by reference.

TECHNICAL FIELD

The present application relates generally to wireless networks and, more specifically, to a transmitting CQI information in a wireless network.

BACKGROUND

The 3GPP LTE (Long Term Evolution) standard is the last stage in the realization of true 4th generation (4G) of mobile telephone networks. Most major mobile carriers in the United States and several worldwide carriers have announced plans to convert their networks to LTE beginning in 2009. LTE is a set of enhancements to the Universal Mobile Telecommunications System (UMTS). Much of 3GPP Release 8 will focus on adopting 4G mobile communications technology, including an all-IP flat networking architecture.

The 3GPP LTE standard uses oorthogonal frequency division multiplexing (OFDM) for the downlink (i.e., from the base station to the mobile station). Orthogonal frequency division multiplexing (OFDM) is a multi-carrier transmission technique that transmits on many orthogonal frequencies (or subcarriers). The orthogonal subcarriers are individually modulated and separated in frequency such that they do not interfere with one another. This provides high spectral efficiency and resistance to multipath effects.

The following prior art reference documents are hereby incorporated into the present disclosure as if fully set forth herein:

1) 3GPP TS 36.211, v. 8.8.0 (2009-09), "$3^{rd}$ Generation Partnership Project; Technical Specification Group Radio Access Network; Evolved Universal Terrestrial Radio Access (E-UTRA); Physical Channels And Modulation (Release 8)", 2009 (hereafter "REF1");
2) 3GPP TS 36.212, v. 8.8.0 (2009-12), "$3^{rd}$ Generation Partnership Project; Technical Specification Group Radio Access Network; Evolved Universal Terrestrial Radio Access (E-UTRA); Multiplexing And Channel Coding (Release 8)", 2009 (hereafter "REF2");
3) 3GPP TS 36.213, v. 8.8.0 (2009-09), "$3^{rd}$ Generation Partnership Project; Technical Specification Group Radio Access Network; Evolved Universal Terrestrial Radio Access (E-UTRA); Physical Layer Procedures (Release 8)", 2009 (hereafter "REF3"); and
4) 3GPP TSG-RAN WG1 Meeting #59, Document No. R1-095130, "CR 36.213 Introduction Of Enhanced Dual Layer Transmission", November 2009 (hereafter "REF4").

For the sake of convenience, the terms "eNodeB" and "base station" may be used interchangeably herein to refer to the network infrastructure components that provide wireless access to remote terminals. However, it will be recognized by those skilled in the art that, depending on the network type, other well-known terms, such as "access point", may be used instead of base station (BS) or eNodeB.

Also, for the sake of convenience, the terms "user equipment" and "mobile station" may be used interchangeably herein to designate any remote wireless equipment that wirelessly accesses a base station (or eNodeB), whether or not the mobile station is a truly mobile device (e.g., cell phone) or is normally considered a stationary device (e.g., desktop personal computer, vending machine, etc.). However, it will again be recognized by those skilled in the art that, depending on the network type, other well-known terms, such as "subscriber station", "remote terminal", or "wireless terminal", may be used instead of user equipment (UE) or mobile station (MS).

In REF4 above, channel quality indicator (CQI) and precoding matrix indicator (PMI) are defined. The CQI indices and their interpretations are given in Table 7.2.3-1 of REF4 and are reproduced below.

TABLE 7.2.3-1 of 3GPP TS 36.213
4-Bit CQI Table

| CQI INDEX | MODULATION | CODE RATE x 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

More generally, a mobile station (or user equipment) may report back to a wireless network at least one of CQI, PMI, modulation scheme, and transport block size.

Based on an unrestricted observation interval in time and frequency, the user equipment (or mobile station) derives for each CQI value reported in uplink subframe n the highest CQI index between 1 and 15 in Table 7.2.3-1 that satisfies the following condition (or CQI index 0 if CQI index 1 does not satisfy the condition): a single PDSCH transport block with a combination of modulation scheme and transport block size corresponding to the CQI index, and occupying a group of downlink physical resource blocks termed the CQI reference resource, could be received with a transport block error probability not exceeding 0.1.

A combination of modulation scheme and transport block size corresponds to a CQI index if all of the following three conditions are met: i) the combination could be signaled for transmission on the PDSCH in the CQI reference resource according to the relevant Transport Block Size table, ii) the modulation scheme is indicated by the CQI index, and iii) the combination of transport block size and modulation scheme, when applied to the reference resource, results in the code rate which is the closest possible to the code rate indicated by the CQI index. If more than one combination of transport block size and modulation scheme results in a code rate equally close to the code rate indicated by the CQI index, only the combination with the smallest of such transport block sizes is relevant.

In the CQI reference resource, the UE (or MS) shall assume the following for the purpose of deriving the CQI index: 1) the first 3 OFDM symbols are occupied by control signaling; 2) no resource elements are used by primary or secondary synchronization signals or physical broadcast channel (PBCH); 3) cyclic prefix (CP) length is that same as for the non-MBSFN subframes; 4) redundancy version 0; and 5) the physical downlink shared channel (PDSCH) transmission scheme given by Table 7.2.3-0 (reproduced below), depending on the transmission mode currently configured for the UE or MS (which may be the default mode).

TABLE 7.2.3-0 of R1-095130 for 3GPP TS 36.213
PDSCH Transmission Scheme for CQI Reference Resource

| TRANS-MISSION MODE | TRANSMISSION SCHEME OF PDSCH |
|---|---|
| 1 | SINGLE-ANTENNA PORT, PORT 0 |
| 2 | TRANSMIT DIVERSITY |
| 3 | TRANSMIT DIVERSITY IF THE ASSOCIATED RANK INDICATOR IS 1, OTHERWISE LARGE DELAY CDD |
| 4 | CLOSED-LOOP SPATIAL MULTIPLEXING |
| 5 | MULTI-USER MIMO |
| 6 | CLOSED-LOOP SPATIAL MULTIPLEXING WITH A SINGLE LAYER TRANSMISSION |
| 7 | IF THE NUMBER OF PBCH ANTENNA PORTS IS ONE, SINGLE-ANTENNA PORT, PORT 0; OTHERWISE TRANSMIT DIVERSITY |
| 8 | IF THE UE IS CONFIGURED WITHOUT PMI/RI REPORTING: IF THE NUMBER OF PBCH ANTENNA PORTS IN ONE, SINGLE-ANTENNA PORT, PORT 0; OTHERWISE TRANSMIT DIVERSITY IF THE UE IS CONFIGURED WITH PMI/RI REPORTING: CLOSED-LOOP SPATIAL MULTIPLEXING |

For the purpose of deriving the CQI index, the UE (or MS) also shall assume that the ratio of PDSCH energy per resource element (EPRE) to cell-specific reference signal (RS) EPRE is as given in Section 5.2 (Downlink Power Allocation) of REF3 above, with the exception of the $\rho_A$ value, which shall be assumed to be:

$$\rho_A = P_A + \Delta_{offset} + 10 \log_{10}(2)(dB) \quad [\text{Eqn. 1}]$$

for any modulation scheme, if the UE (or MS) is configured with transmission mode 2 with 4 cell-specific antenna ports, or transmission mode 3 with 4 cell-specific antenna ports and the associated rank indicator (RI) is equal to one; or $$\rho_A = P_A + \Delta_{offset}(dB) \quad [\text{Eqn. 2}]$$

for any modulation scheme and any number of layers, otherwise.

The shift $\Delta_{offset}$ is given by the parameter nomPDSCH-RS-EPRE-Offset which is configured by higher-layer signaling.

Precoding Matrix Indicator (PMI)

For transmission modes 4, 5 and 6 in Table 7.2.3-0, precoding feedback is used for channel dependent codebook-based precoding and relies on each UE reporting the precoding matrix indicator (PMI) value. For transmission mode 8, the UE/MS shall report the PMI value if the US/MS is configured with PMI/RI reporting. A UE shall report PMI based on the feedback modes described in Sections 7.2.1 and 7.2.2 of REF3.

Each PMI value corresponds to a codebook index given in Table 6.3.4.2.3-1 or Table 6.3.4.2.3-2 of REF3 as follows: 1) for 2 antenna ports {0, 1} and an associated rank indication (RI) value of 1, a PMI value of n E {0, 1, 2, 3} corresponds to the codebook index n given in Table 6.3.4.2.3-1 of REF3 with v=; 2) for 2 antenna ports {0, 1} and an associated RI value of 2, a PMI value of n E {0, 1} corresponds to the codebook index n+1 given in Table 6.3.4.2.3-1 of REF3 with v=2; and 3) for 4 antenna ports {0, 1, 2, 3}, a PMI value of n s {0, 1, 2, ..., 15} corresponds to the codebook index n given in Table 6.3.4.2.3-2 of REF3 with v equal to the associated RI value. For other transmission modes, PMI reporting is not supported.

In Section 5 (Power Control) of REF3, it is noted that downlink power control determines the energy per resource element (EPRE). The term "resource element energy" denotes the energy prior to CP insertion. The term "resource element energy" also denotes the average energy taken over all constellation points for the modulation scheme applied. Uplink power control determines the average power over a single carrier, frequency division multiple access (SC-FDMA) symbol in which the physical channel is transmitted.

In Section 5.2 (Downlink Power Allocation) of REF3, it is noted that eNodeB (or the base station) determines the downlink transmit energy per resource element. The user equipment (UE) or mobile station (MS) may assume downlink cell-specific, reference signal energy per resource element (RS EPRE) is constant across the downlink system bandwidth and constant across all subframes until different cell-specific RS power information is received.

FIG. 4 illustrates a resource block (RB) in a 3GPP LTE system according to an exemplary embodiment of the prior art. In Release 8 of 3GPP, downlink (DL) power allocation indicates to a UE (or MS) an EPRE map that may be assumed for the purpose of demodulation for each cell-specific antenna port (or cell-specific reference signal (RS) port or CRS port). FIG. 4 illustrates an exemplary EPRE map for a resource block (RB) in Release 8.

The resource block in FIG. 4 depicts part of a physical downlink shared channel (PDSCH) of a subframe. The horizontal axis indicates time. The vertical axis indicates frequency. In FIG. 4, each OFDM symbol is aligned vertically. The squares in each vertical column represent different sub-carrier frequencies that are part of the same OFDM symbol. The squares in each horizontal row represent the same sub-carrier frequency in different OFDM symbols. Thus, each square represents a time-frequency resource element (RE) that may be individually modulated to transmit information.

Each OFDM symbol comprises N sequential subcarriers, where N may be, for example, 512, 1024, 2048, and so forth. As noted, each subcarrier may be individually modulated. For practical reasons, only a small segment of each OFDM symbol may be shown for the resource block (RB) in FIG. 4. The exemplary RB spans an exemplary one (1) millisecond subframe, where each subframe comprises two (2) slots, each equal to 0.5 milliseconds in duration. The subframe contains 14 sequential OFDM symbols, so that each slot contains 7 sequential OFDM symbols. The 7 OFDM symbols in each slot are labeled S0, S1, S2, S3, S4, S5, and S6. However, this is by way of example only and should not be construed to limit the scope of the present disclosure. In alternate embodiments, the slots may be greater than or less than 0.5 milliseconds in duration and a subframe may contain more than or less than 14 OFDM symbols.

In the exemplary embodiment, the resource block (RB) spans 12 sequential subcarriers in the frequency dimension and 14 OFDM symbols in the time dimension. Thus, the RB contains 168 time-frequency resources. Again, however, this is by of example only. In alternate embodiments, the RB may span more than or less than 12 subcarriers and more than or less than 14 OFDM symbols, so that the total number of resource elements (REs) in the RB may vary. In a multi-antenna system, such as a multiple-input, multiple-output (MIMO) base station, the subcarriers labeled CRS P0, CRS P1, CRS P2, and CRS P3 represent cell-specific reference signals (e.g., pilot signals) for a particular antenna port. Thus, for example, CRS P0 is the cell-specific reference signal (CRS) for antenna port 0. For the purposes of this disclosure, it shall be assumed that the EPRE for each of CRS P0, CRS P1, CRS P2, and CRS P3 (i.e., the antenna ports) is the value, P.

The data EPRE values in FIG. 4 are denoted by letters A and B, depending on type of OFDM symbols on which data EPREs are located. When a data resource element (RE) is located in an OFDM symbol that does not contain a CRS resource element (RE), the EPRE is denoted by the value, A. By way of example, OFDM symbol S3 in the even-numbered slot in FIG. 4 does not contain a CRS RE, therefore each data RE in OFDM symbol S3 is labeled A. When a data RE is located in an OFDM symbol that does contain a CRS RE, the EPRE is denoted by the value, B. By way of example, OFDM symbol S4 in the even-numbered slot in FIG. 4 does contain CRS REs, therefore each data RE in OFDM symbol S4 is labeled B.

A Release 8 base station (or eNodeB) signals three parameters to a UE (or MS) to indicate to the UE the EPRE map associated with the UE, including two cell-specific parameters and one UE-specific parameter. The two cell-specific parameters are the CRS value, P, and $\rho_B/\rho_A$=B/A, where $\rho_A$=A/P and $\rho_B$=B/P. The one UE-specific parameter is the power ratio of A to P, or $\rho_A$=A/P. Using these three parameters from the eNodeB, a UE is capable of determining the EPRE map in FIG. 4.

DM-RS Patterns

The demodulation reference signal (DM-RS) may also be called the dedicated RS (DRS) or UE-specific RS (UE-RS). The DRS is transmitted by the base station (or eNodeB) and is used for demodulation by the UE. A DRS for a data stream (or layer) is precoded with the same precoding vector that is used for precoding the data stream.

FIGS. 5A-5C illustrate 2 DRS patterns and 4 DRS patterns in resource blocks according to exemplary embodiments of the prior art. Resource block (RB) 500A in FIG. 5A depicts Rank-2 DRS Pattern A for a pilot signal pattern that can support up to 2 layer transmissions. Resource block (RB) 500B in FIG. 5B depicts Rank-2 DRS Pattern B for a pilot signal pattern that can support up to 2 layer transmissions. The reference signals for the two layers are code-division multiplexed within a pair of two adjacent DRS resource elements. Thus, in FIG. 5A, each instance of two adjacent resource elements labeled DRS P7,8 indicates code-division multiplexed DRS REs for antenna port 7 and antenna port 8. Similarly, in FIG. 5B, each instance of two adjacent resource elements labeled DRS P9,10 indicates code-division multiplexed DRS REs for antenna port 9 and antenna port 10.

Resource block 500C in FIG. 5C depicts a DRS pattern that supports up to four layer transmissions, where DRS resource elements are partitioned into two groups. One group of DRS REs carries the code-division multiplexed dedicated reference signals (DRSs) for antenna ports 7 and 8 (for layers 0 and 1). The other group of DRS REs carries the code-division multiplexed dedicated reference signals (DRSs) for antenna ports 9 and 10 (for layers 2 and 3).

FIGS. 6A and 6B illustrate 8 DRS patterns based on DRS code-division multiplexing in resource blocks according to exemplary embodiments of the prior art. In FIGS. 6A and 6B, some resource element (RE) are labeled with one of the alphabet characters G, H, I, J, L, or K, to indicate the RE is used to carry a number of DRS among the 8 DRS.

Resource block (RB) 600A in FIG. 6A depicts Rank-8 pattern A, which is based on spreading factor 2 code-division multiplexing (CDM) across two time-adjacent REs with the same alphabet label. Resource block (RB) 600B in FIG. 6B depicts Rank-8 pattern B, which is based on spreading factor 4 code-division multiplexing across two groups of two time-adjacent REs with the same alphabet label.

The 8 antenna ports in the Rank-8 patterns in FIGS. 6A and 6B are referred to as antenna ports 11 through 18 to distinguish the Rank-8 patterns from the antenna ports in the Rank-2 and Rank-4 pattern. Thus, for the Rank-8 Pattern A in FIG. 6A, the two adjacent resource elements labeled DRS G carry the CDMed DRS 11, 12. The two adjacent resource elements labeled DRS H carry the CDMed DRS 13, 14. The two adjacent resource elements labeled DRS I carry the CDMed DRS 15, 16. The two adjacent resource elements labeled DRS J carry the CDMed DRS 17, 18.

On the other hand, for the Rank-8 Pattern B in FIG. 6B, the two adjacent resource elements labeled DRS K carry the CDMed DRS 11, 12, 13, 14. Similarly, the two adjacent resource elements labeled DRS L carry the CDMed DRS 15, 16, 17, 18.

Control Signaling

Generally, there are two types of signaling: higher-layer signaling and physical-layer signaling. Higher-layer signaling includes broadcast signaling and RRC signaling, which can be semi-static signaling. Broadcast signaling lets the UEs know cell-specific information, while RRC signaling lets the UEs know UE-specific information.

Physical-layer signaling includes dynamic signaling, where the dynamic signaling may happen in a physical downlink control channel (PDCCH) in those subframes where the BS or eNodeB wants to transmit signals to the Ms (or UE). For this type of dynamic signaling, a downlink control information (DCI) format may be defined, where DCI is transmitted in the PDCCH.

U.S. patent application Ser. No. 12/899,362, entitled "Methods And Apparatus For Multi-User MIMO Transmission in Wireless Communication Systems" and filed Oct. 6, 2010, now U.S. Pat. No. 9,031,008, introduced DCI format 2C for LTE Release 10 downlink (DL) grant supporting up to rank 8. The DCI format 2C is based on DCI format 2B. U.S. patent application Ser. No. 12/899,362 is hereby incorporated into the present application as if fully set forth herein.

A transport block (TB) is a bit stream carried from a higher layer. In the physical layer, a TB is mapped into a codeword (CW). In Release 8 LTE, up to two TBs (and thus up to two CWs) can be scheduled to a UE in a set of time-frequency resources in a subframe.

CSI-RS Transmissions

U.S. patent application Ser. No. 12/709,399, entitled "Method And System For Mapping Pilot signals In Multi-Stream Transmissions" and filed Feb. 19, 2010, introduced mapping methods for channel-state-information (CSI) reference signals, sometimes called channel-quality-information RS (or CSI-RS). U.S. patent application Ser. No. 12/709,399 is hereby incorporated into the present application as if fully set forth herein.

A channel-state-information reference signal (CSI-RS) mapping pattern is defined as a set of resource elements (REs) in one resource block (RB) spanning two slots (or one subframe), where the pattern repeats in every RB in a subset or in the set of RBs in the system bandwidth. CSI-RS resource elements may reside in only one slot or in both slots in a RB in one subframe. A CSI-RS mapping pattern is provided for estimating channel state information at the receiver side for multiple transmit (Tx) antenna port channels. CSI may include channel quality information (CQI), rank information (RI), precoding matrix information (PMI), channel direction information (CDI), and so forth.

However, CSI subframes (i.e., subframes where CSI-RSs are transmitted) may be transmitted periodically (e.g., every 5 subframes) or aperiodically. FIG. 7 illustrates an example of CSI-RS mapping in subframes in a radio frame. In FIG. 7, there are four types of subframes, depending on whether or not CSI-RS resources elements and CRS resource elements are allocated in the PDSCH region. For example, a Type A subframe (SF) does not contain CSI-RS, but does contain CRS in the PDSCH region. Subframe 0 (SF0), Subframe 1 (SF1), Subframe 3 (SF3), Subframe 5 (SF5), Subframe 8 (SF8) and Subframe 9 (SF9) are Type A subframes.

The user equipment uses the CSI-RS resource elements and the CRS resource elements (among others) to determine and to report back to a wireless network at least one of CQI, PMI, modulation scheme, and transport block (TB) size. It is noted that in a given network, not all four types of subframe may be present. Therefore, CSI-RS and CRS resource elements may not be present in certain subframe (SF) types. Thus, interpretation of the feedback data (i.e., CQI, PMI, modulation scheme, TB size) is dependent on the type of subframe the MS/UE receives.

However, the prior art does not provide a mobile station (or UE) that considers the subframe (SF) type when determining CQI, PMI, and other feedback parameters. The prior art also does not provide a base station that interprets feedback parameters based on the SF type assumed by the MS/UE when determining the feedback parameters. Thus, there is a need in the art for improved apparatuses and methods that account for SF type in the determination and interpretation of feedback parameters.

SUMMARY

To address the above-discussed deficiencies of the prior art, it is a primary object to provide a base station for use in a wireless network capable of communicating with a plurality of mobile stations. The base station transmits to a first mobile station downlink subframes of OFDM symbols. Each downlink subframe comprises a plurality of resource blocks and is associated with a subframe (SF) type that is determined according to whether or not a PDSCH region of a resource block in a downlink subframe includes at least one of: 1) a cell-specific reference signal (CRS) resource element and 2) a channel-state-information reference signal (CSI-RS) resource element. The base station receives from the first mobile station at least one of CQI, PMI, modulation scheme, and transport block size and interprets the received at least one of CQI, PMI, modulation scheme, and transport block size according to a default SF type used by the first mobile station to determine the at least one of CQI, PMI, modulation scheme, and transport block size.

It is a further primary object to provide, a mobile station for use in a wireless network comprising a plurality of base stations. The mobile station receives from a first base station downlink subframes of OFDM symbols. Each downlink subframe comprises a plurality of resource blocks and is associated with a subframe (SF) type that is determined according to whether or not a PDSCH region of a resource block in a downlink subframe includes at least one of: 1) a cell-specific reference signal (CRS) resource element and 2) a channel-state-information reference signal (CSI-RS) resource element. The mobile station assumes that the received downlink subframes are of a default SF type and uses the received downlink subframes to determine at least one of CQI, PMI, modulation scheme, and transport block size according to the default SF type.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A and 2B are high-level diagrams of an exemplary base station (or eNodeB) according to one embodiment of present disclosure;

FIG. 7 illustrates an example of CSI-RS mapping in subframes in a radio frame;

FIGS. 9A-9D illustrate four types of EPRE maps for two cell-specific antenna ports according to an exemplary embodiment of the present disclosure;

FIGS. 10A and 10B illustrate an example of rank-dependent EPRE mapping according to an exemplary embodiment of the present disclosure;

FIG. 11 illustrates the DM-RS pattern for a 3GPP LTE system in Release 9; and

DETAILED DESCRIPTION

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
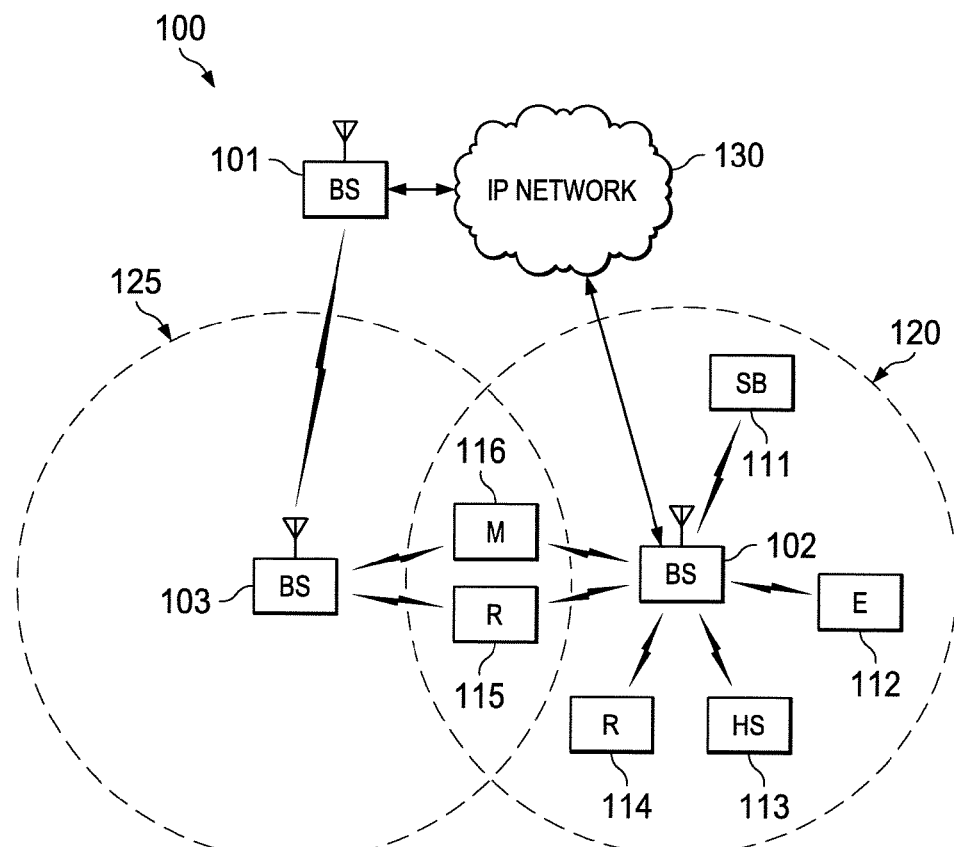
FIG. 1 illustrates an exemplary wireless network that transmits channel state information (CSI) according to the principles of the present disclosure.

FIG. 1 illustrates exemplary wireless network 100, which transmits channel state information (CSI) according to the principles of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network. Base stations 101-103 may alternatively be referred to as eNodeBs 101-103.

Base station 102 provides wireless broadband access to IP network 130 (i.e., the Internet) to a first plurality of mobile stations within coverage area 120 of base station 102. BS 102 has a wireline backhaul to IP network 130. The first plurality of mobile stations includes mobile station (MS) 111, mobile station (MS) 112, mobile station (MS) 113, mobile station (MS) 114, mobile station (MS) 115 and mobile station (MS) 116. In an exemplary embodiment, MS 111 may be located in a small business (SB), MS 112 may be located in an enterprise (E), MS 113 may be located in a WiFi hotspot (HS), MS 114 may be located in a first residence (R), MS 115 may be located in a second residence, and MS 116 may be a mobile (M) device. Mobile stations 111-116 may alternatively be referred to as user equipment 111-116.

Base station 103 provides wireless broadband access to IP network 130 to a second plurality of mobile stations within coverage area 125 of base station 103. BS 103 has a wireless backhaul to IP network 130. The second plurality of mobile stations includes mobile station 115 and mobile station 116.

In other embodiments, wireless network 100 may include either fewer or more base stations. It is noted that mobile station 115 and mobile station 116 are on the edge of both coverage area 120 and coverage area 125. Mobile station 115 and mobile station 116 each communicate with both base station 102 and base station 103 and may be said to be operating in handoff mode, as known to those of skill in the art.

In an exemplary embodiment, base stations 101-103 may communicate with each other and with mobile stations 111-116 in at least the downlink using orthogonal frequency division multiplexing (OFDM) protocol, according to the proposed 3GPP LTE standard, or an equivalent advanced 3G or 4G standard.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the mobile stations, weather conditions, and other factors. In an embodiment, the radius of the coverage areas of the base stations, for example, coverage areas 120 and 125 of base stations 102 and 103 may extend in the range from less than 2 kilometers to about fifty kilometers from the base stations.

As is well known in the art, a base station may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

FIGS. 2A and 2B are high-level diagrams of exemplary base station (eNodeB) 102 according to one embodiment of present disclosure. BS 102 comprises transmit path circuitry 200 and receive path circuitry 250. Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Serial-to-parallel block 210 converts (i.e., de-multiplexes) the serial QAM symbols to parallel data to produce N parallel symbol streams where N is the IFFT/FFT size used in transmit path circuitry 200 and receive path circuitry 250. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal.

Finally, up-converter 230 modulates (i.e., up-converts) the output of add cyclic prefix block 225 to RF frequency for transmission via a wireless channel. The signal may also be filtered at baseband before conversion to RF frequency. In an exemplary embodiment, the time-domain output transmitted by transmit path circuitry 200 may be transmitted via multiple antennas to mobile stations within range of BS 102.

Receive path circuitry 250 receives incoming downlink signals transmitted by mobile stations 111-116. Down-converter 255 down-converts the received signal to baseband frequency and remove cyclic prefix block 260 removes the cyclic prefix to produce a serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and decodes the date symbols to recover the original data streams transmitted by mobile stations 111-116.

According to the principles of the present disclosure, in a new release of 3GPP LTE, BS 102 will transmit four types of downlink subframes, depending on whether CSI-RS resource elements and CRS resource elements are transmitted in the physical data shared channel (PDSCH) region or not. A new transmission mode (denoted Transmission Mode A) is defined that relies solely on CSI-RS for channel measurement (e.g., CQI/PMI). Since there are four types of subframes, a CQI value may be dependent on a type of subframes that a MS or UE assumes for calculating the CQI value. If a BS or eNodeB is not aware of the type of subframe that is assumed by the BS/UE when the BS/UE calculate the CQI, the BS (or eNodeB) will not know the true meaning of the CQI value and may be unable to perform proper link adaptation. Therefore, a CQI reference resource (i.e., what type of resource to assume in the UE for CQI/PMI calculation) is defined for the new Transmission Mode A to avoid mistake and to assist link adaptation at the eNodeB.

A first exemplary definition of Transmission Mode A is shown below in TABLE 1. In TABLE 1, the PDCCH and the PDSCH are configured by the scrambling sequence C-RNTI.

TABLE 1

| Transmission mode | DCI format | Search Space | Transmission scheme of PDSCH corresponding to PDCCH |
|---|---|---|---|
| Mode A | DCI format 1A | Common and UE-specific by C-RNTI | If the number of PBCH antenna ports is one, Single-antenna port, port 0 is used, otherwise Transmit diversity. |
|  | DCI format 2C | UE-specific by C-RNTI | MIMO SM transmission up to rank 8, where rank number of UE-specific antenna ports provided, whose UE RS patterns are from FIGS. 5A-5C or FIGS. 6A-6B. |

A second exemplary definition of Transmission Mode A is shown below in TABLE 2. In TABLE 2, the PDSCH and the PDSCH are configured by the scrambling sequence SPS C-RNTI.

TABLE 2

| Transmission mode | DCI format | Search Space | Transmission scheme of PDSCH corresponding to PDCCH |
|---|---|---|---|
| Mode A | DCI format 1A | Common and UE-specific by C-RNTI | If the number of PBCH antenna ports is one, Single-antenna port, port 0 is used, otherwise Transmit diversity. |
|  | DCI format 2C | UE-specific by C-RNTI | Single antenna port; port 7 or 8 or 9 or 10. The RS patterns for the antenna ports can be found in FIGS. 5A-5C. |

Figure 3:
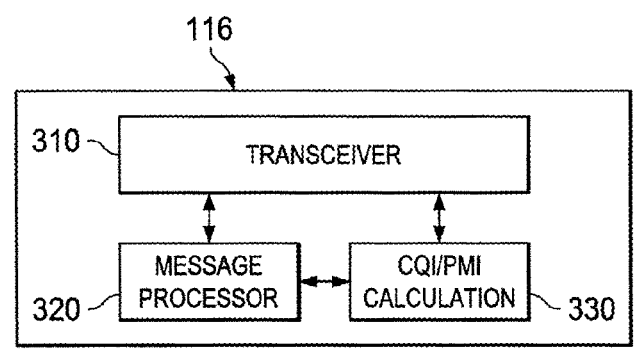
FIG. 3 illustrates a mobile station (or user equipment) that receives channel state information according to an exemplary embodiment of the disclosure.
Figure 4:
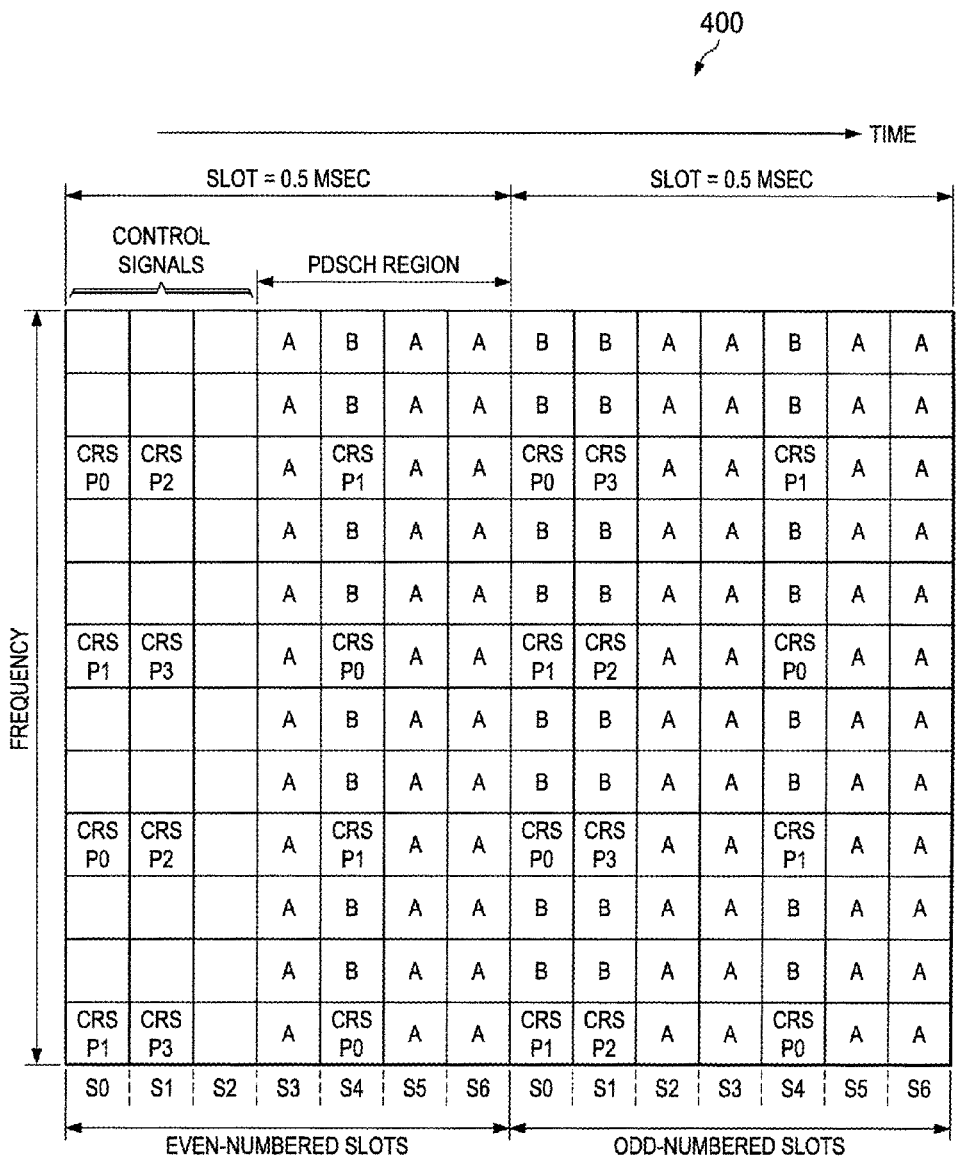
FIG. 4 illustrates a resource block (RB) in a 3GPP LTE system according to an exemplary embodiment of the prior art.
Figure 5A:
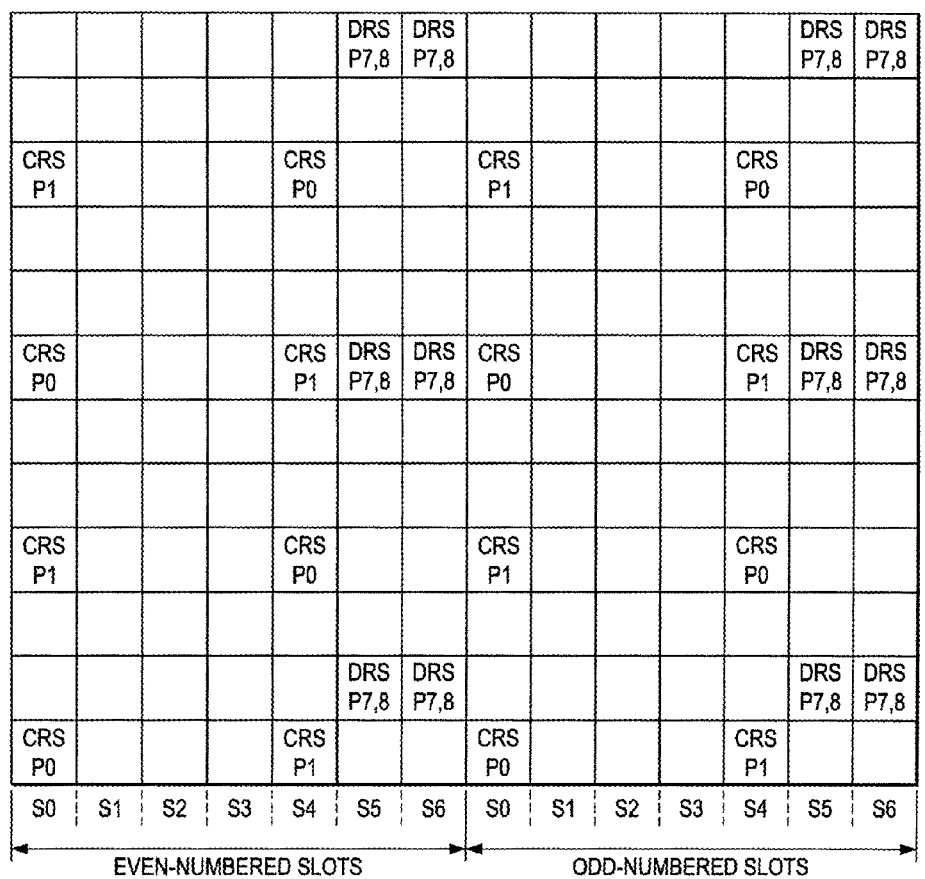
FIGS. 5A-5C illustrate 2 DRS patterns and 4 DRS patterns in resource blocks according to exemplary embodiments of the prior art.
Figure 5B:
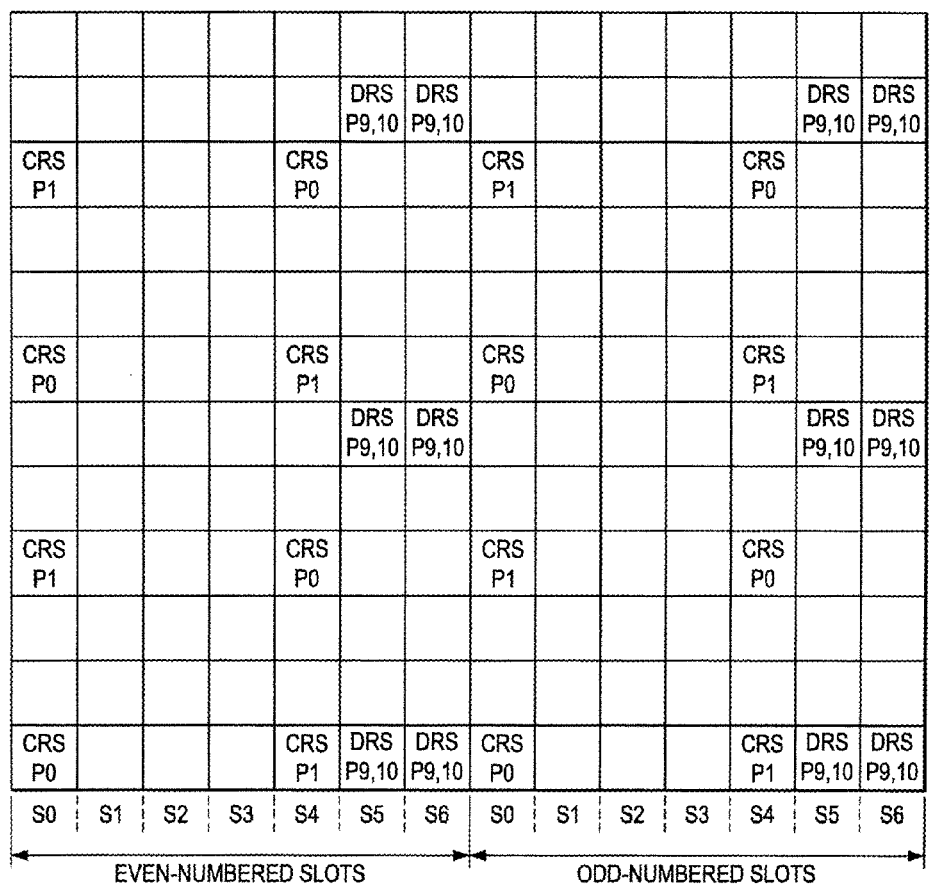
Figure 5C:
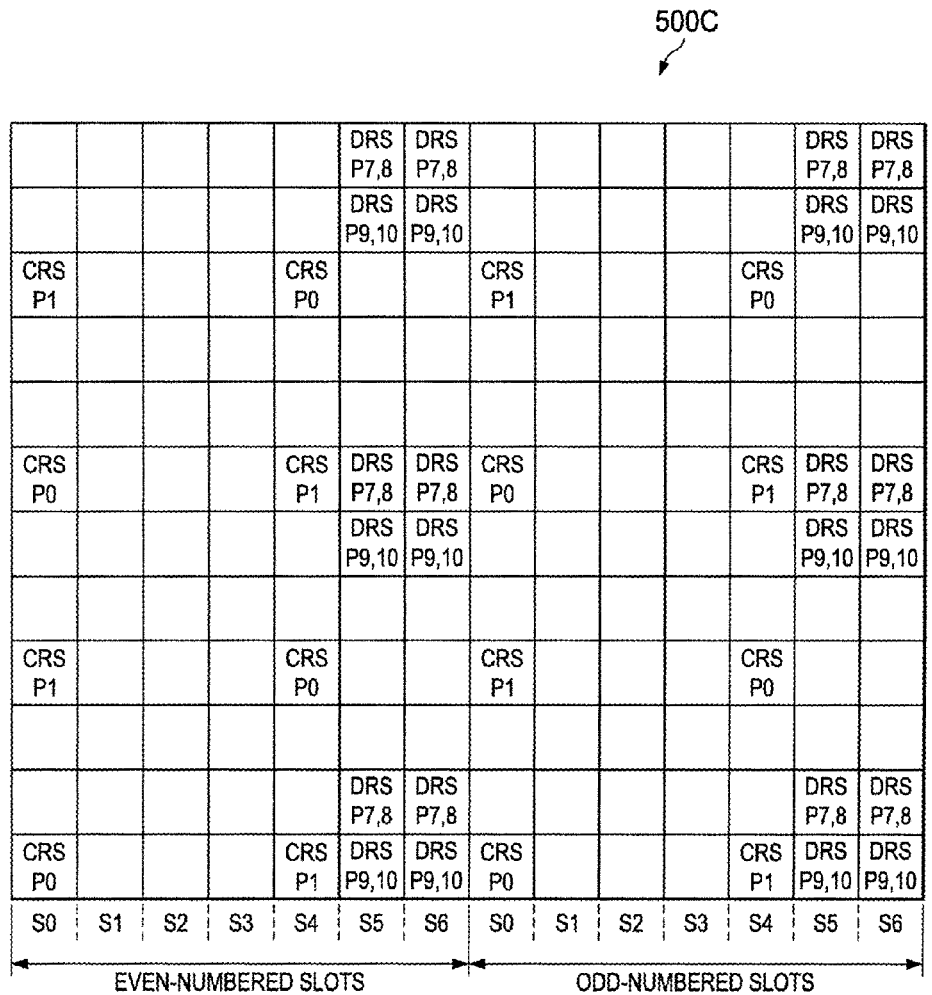
Figure 6A:
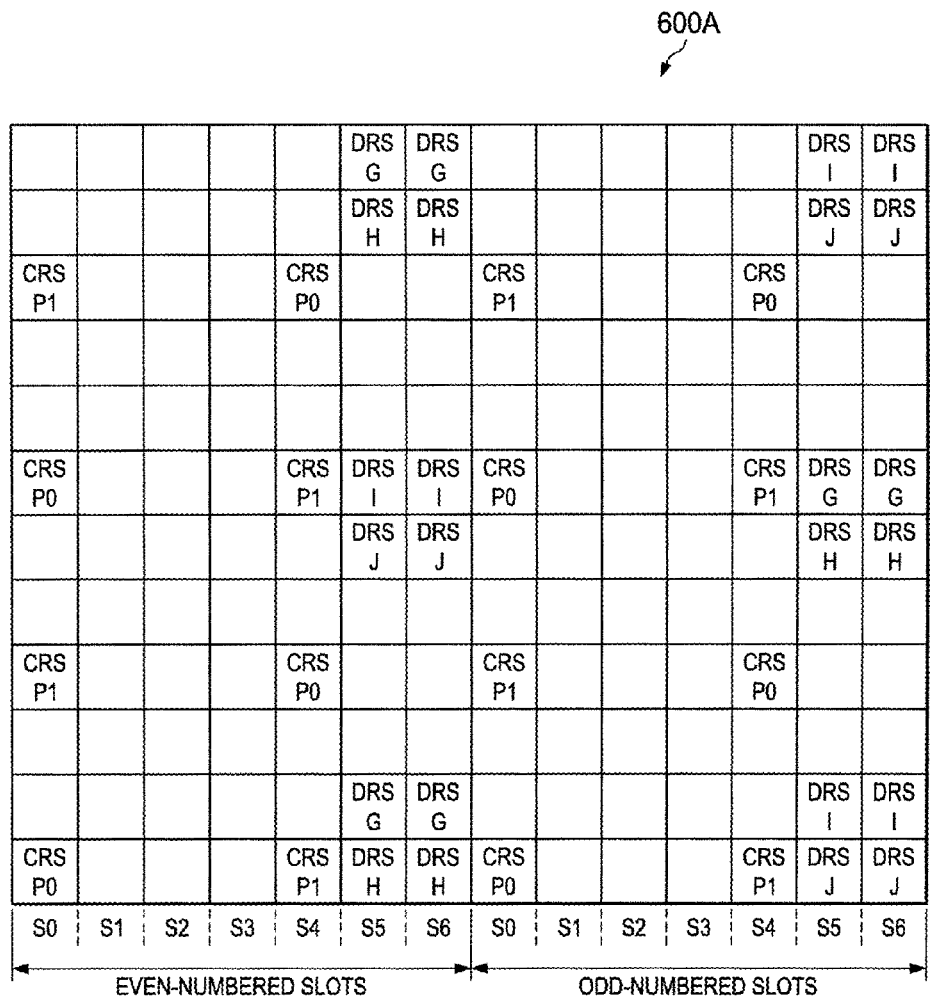
FIGS. 6A and 6B illustrate 8 DRS patterns based on DRS code-division multiplexing in resource blocks according to exemplary embodiments of the prior art.
Figure 6B:
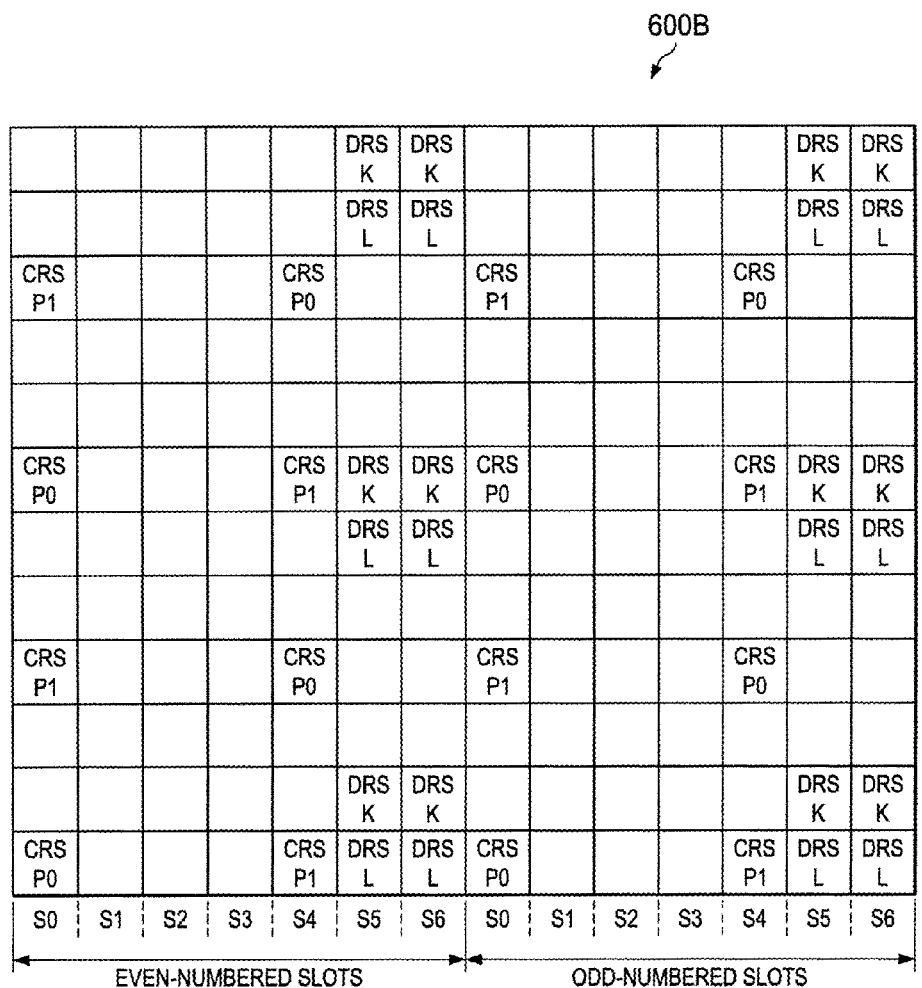

FIG. 3 illustrates mobile station (or user equipment) 116, which receives channel state information (CSI) according to an exemplary embodiment of the disclosure. MS 116 comprises transceiver block 310, message processor 320, and CQI/PMI calculation block 330. During routine operation, message processor 320 uses transceiver block 310 to transmit to, for example, BS 102 and to receive from BS 102. Transceiver block 310 comprises circuit components that are analogous to the components in transmit path circuitry 200 and receive path circuitry 250 in BS 102 and need not be explained in further detail.

CQI/PMI calculation block 330 receives downlink signal measurements from transceiver block 310 and is operable to determine therefrom CQI values and PMI values, among other signal parameters, for the downlink between BS 102 and MS 116. Message processor 320 may receive selected CQI value, PMI values and other selected signal parameters from CQI/PMI calculation block 330 and is operable to transmit control messages and data messages in the uplink to BS 102. By way of example, message processor 320 is operable to transmit feedback messages to BS 102 to report CQI values and PMI values.

FIGS. 8A-8D illustrate four types of EPRE maps for four cell-specific antenna ports according to an exemplary embodiment of the present disclosure. In resource blocks 800A-800D, the resource elements labeled "CRS P0", "CRS P1", "CRS P2" and "CRS P3" are for cell-specific reference signals (CRSs) for the four antenna ports, P0-P3. The resource elements labeled "CSI-RS" are resource elements for channel-state-information reference signals. The resource elements labeled "DM-RS" are resource elements for demodulation reference signals.

Figure 8A:
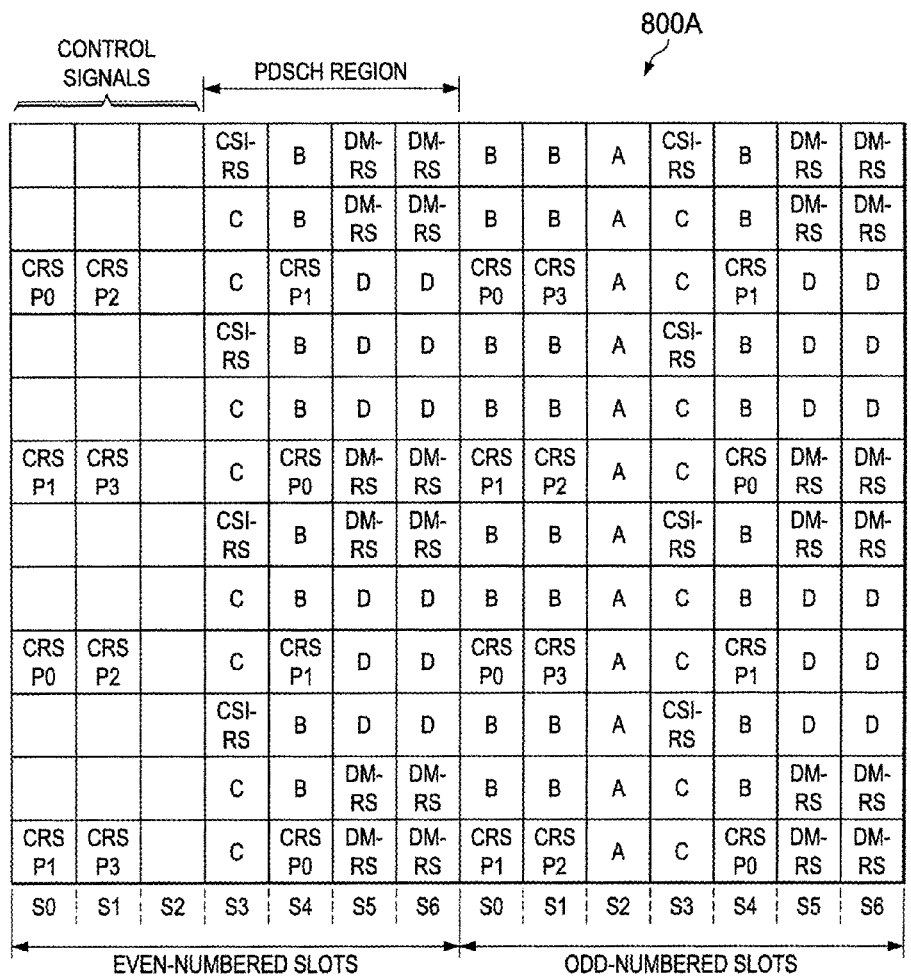
FIGS. 8A-8D illustrate four types of EPRE maps for four cell-specific antenna ports according to an exemplary embodiment of the present disclosure.
Figure 8B:
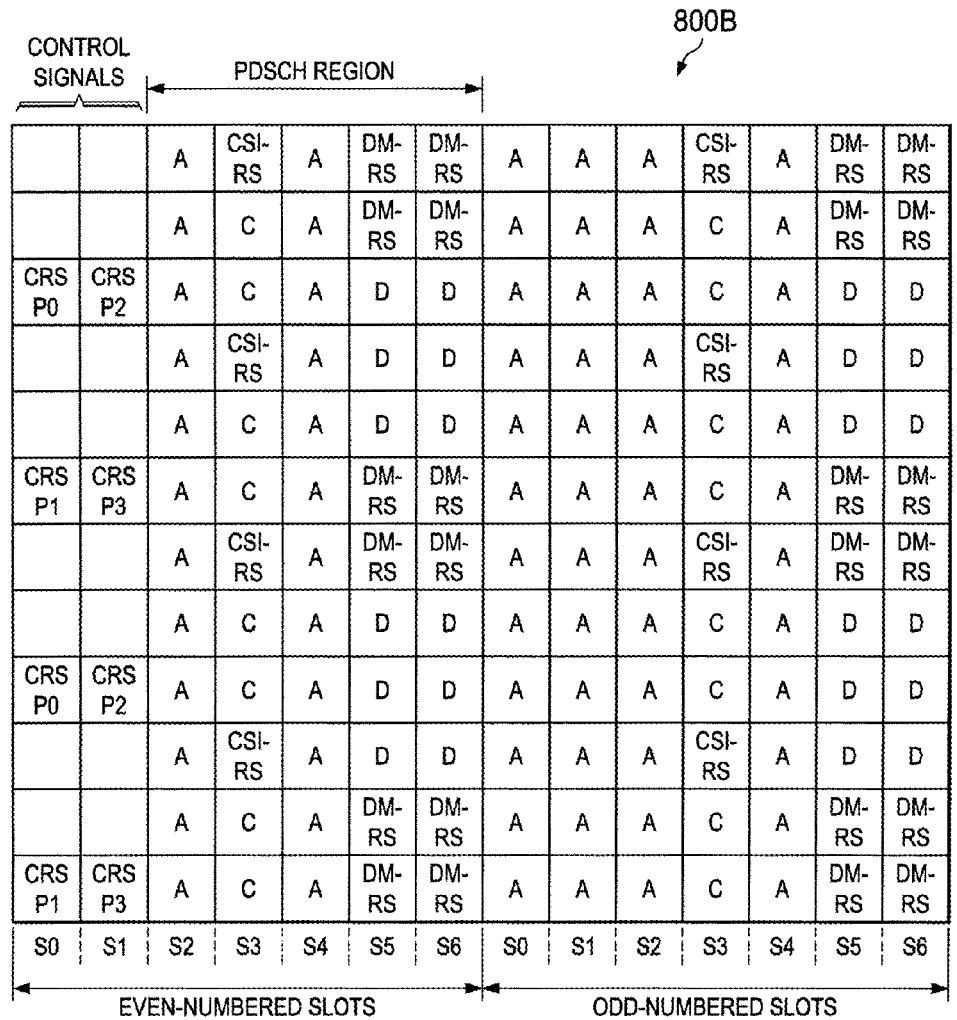
Figure 8C:
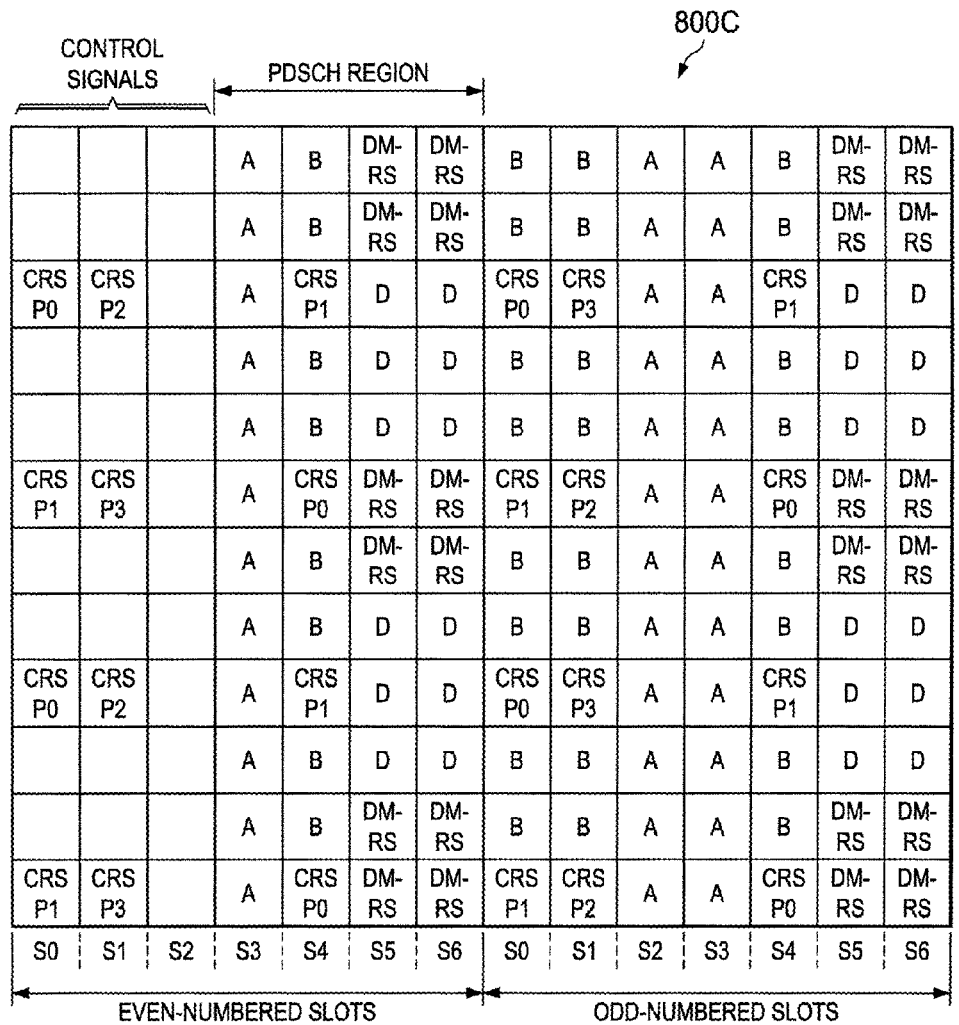
Figure 8D:
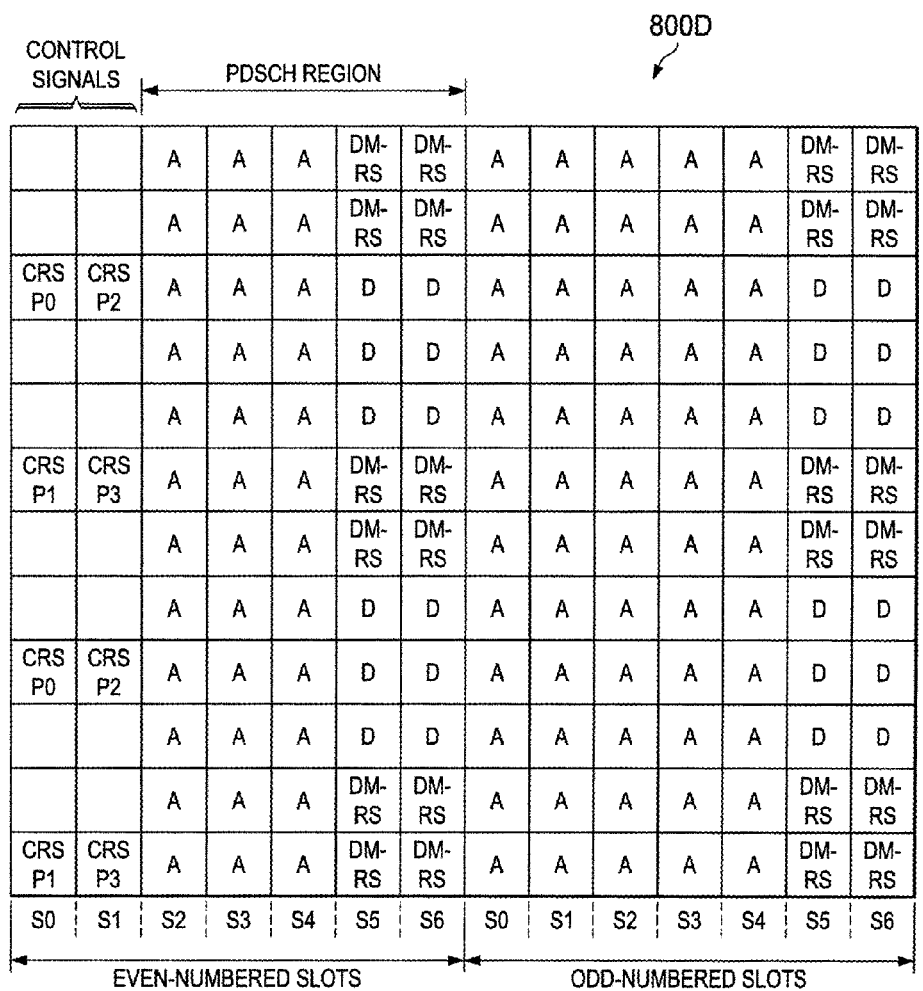
Figure 9A:
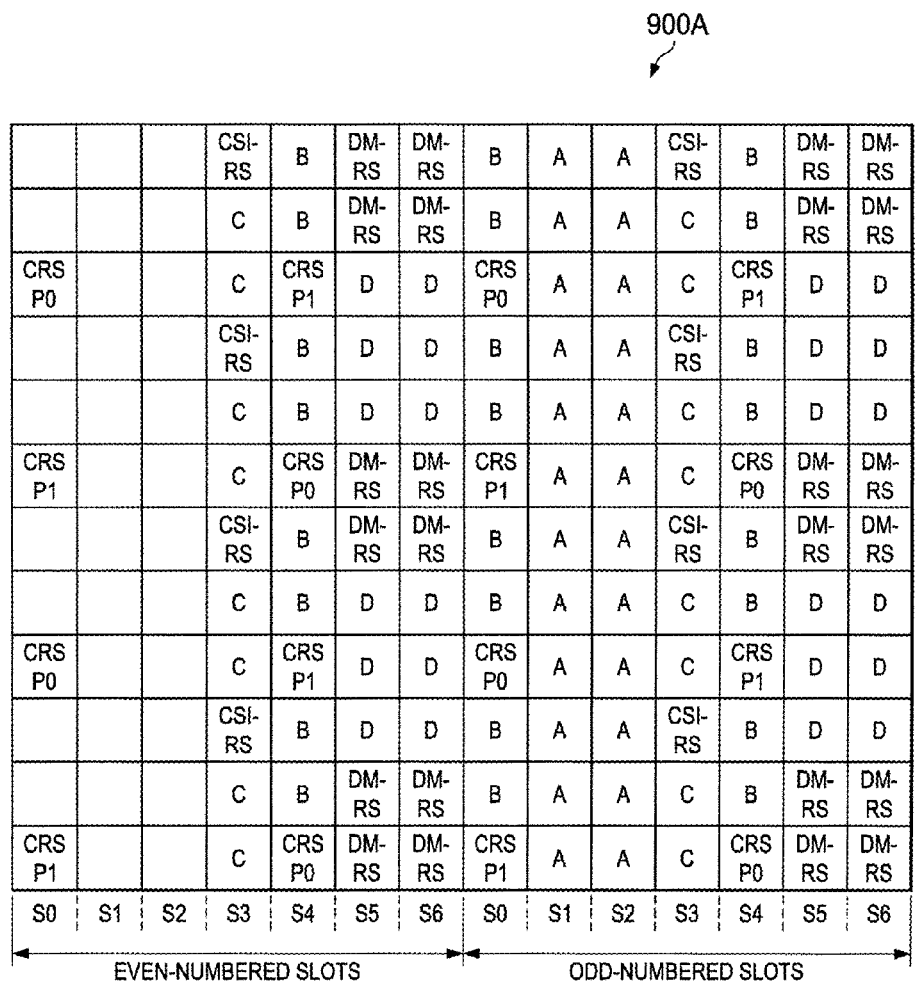
Figure 9B:
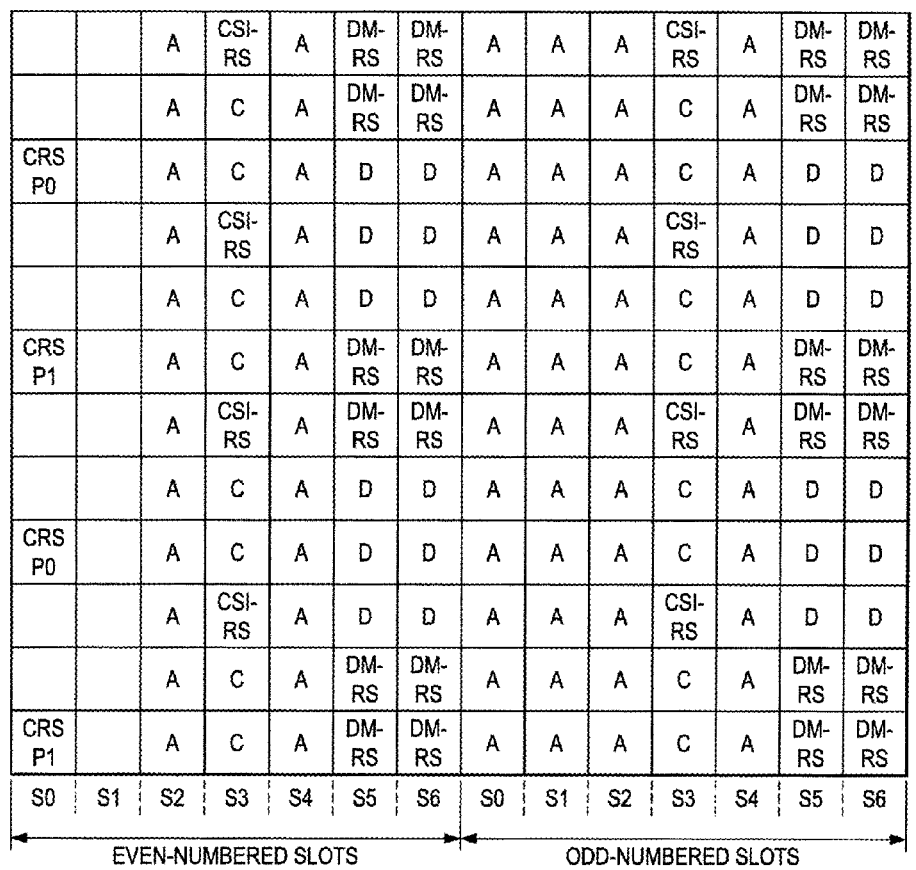
Figure 9C:
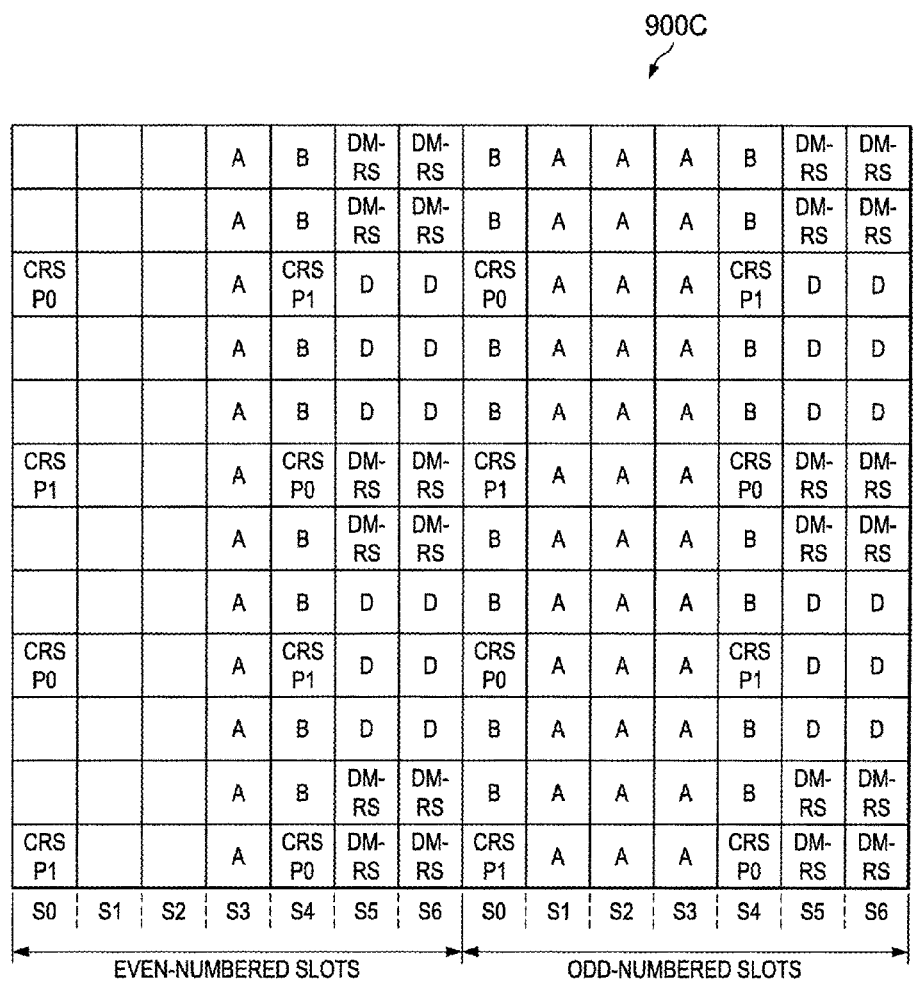

In FIGS. 8A and 8C, the first three OFDM symbols (S0, S1, S2) in the even-numbered slot are used for control signaling, so that the PDSCH region spans the remaining 11 OFDM symbols. In FIGS. 8B and 8D, the first two OFDM symbols (S0, S1) in the even-numbered slot are used for control signaling, so that the PDSCH region spans the remaining 12 OFDM symbols. Resource block (RB) 800A has both CSI-RS resource elements and CRS resource elements. Resource block (RB) 800B has CSI-RS resource elements, but does not have CRS resource elements. Resource block (RB) 800C does not have CSI-RS resource elements, but does have CRS resource elements. Resource block (RB) 800D has neither CSI-RS resource elements nor CRS resource elements.

In FIGS. 8A-8D, seven (7) different EPRE values are defined for each new cell-specific antenna port (or each CSI-RS port). This includes UE-specific EPRE resource elements: 1) A—data EPRE in OFDM symbols without a reference signal (RS); 2) B—data EPRE in OFDM symbols with a cell-specific reference signal (CRS); 3) C—data EPRE in OFDM symbols with a channel-state-information reference signal (CSI-RS); 4) D—data EPRE in OFDM symbols with a demodulation reference signal (DM-RS); and 5) DM-RS—DM-RS average EPRE within a resource element. This also includes cell-specific EPRE resource elements: 1) CRS P0, CRS P1, CRS P2, and CRS P3 EPRE; and 2) CSI-RS EPRE.

For the purposes of this disclosure, it shall be assumed that: 1) the EPRE for each of CRS P0, CRS P1, CRS P2, and CRS P3 (i.e., the antenna ports) is the value P; 2) the EPRE for each of the DM-RS resource elements is the value D; and 3) the EPRE for each of the CSI-RS resource elements is the value Q.

From these EPRE values in the EPRE map, the ratios of PDSCH EPRE to CSI-RS EPRE may be calculated as: 1) $\rho_A = A/P = $ PDSCH EPRE to CSI-RS EPRE ratio in OFDM symbols without RS; 2) $\rho_B = B/P = $ PDSCH EPRE to CSI-RS EPRE ratio in OFDM symbols with CRS; 3) $\rho_C = C/P = $ PDSCH EPRE to CSI-RS EPRE ratio in OFDM symbols with CSI-RS; and 4) $\rho_D = D/P = $ PDSCH EPRE to CSI-RS EPRE ratio in OFDM symbols with DM-RS. These ratios may be signaled from the base station (or eNodeB) to the mobile station (or UE) using a combination of cell-specific and MS-specific signals.

Note that a resource block (RB) without a CRS is from an advanced (or Release 10) subframe configured as MBSFN subframe to Release 8 UEs. In an advanced DL subframe, CRSs are transmitted only in the control region. A base station signals parameters conveying information about these EPREs to each MS via cell-specific and MS-specific signaling methods. Upon receiving the parameters, a MS becomes aware of these four EPRE maps. In some cases, the following may be true: D=A=DM-RS, implying that the data EPRE is the same as the DM-RS EPRE for a CSI-RS port in OFDM symbols with DM-RS and furthermore the data EPRE in the OFDM symbols with DM-RS is the same as the data EPRE in OFDM symbols without an RS.

FIGS. 9A-9D illustrate four types of EPRE maps for two cell-specific antenna ports according to an exemplary embodiment of the present disclosure. Since only two antenna ports are provided, resource blocks 900A-800D contain only two resource elements, labeled "CRS P0" and "CRS P1", for cell-specific reference signals (CRSs) for only two antenna ports, P0 and P1. As before, in FIG. 8A-8D, the resource elements labeled "CSI-RS" are resource elements for channel-state-information reference signals. The resource elements labeled "DM-RS" are resource elements for demodulation reference signals.

According to a first advantageous embodiment of the present disclosure, a MS/UE assumes one specific type of subframe (a pre-determined SF type or default SF type), out of the four types shown in FIG. 7, as a part of CQI reference resource for CQI/PMI estimation for new Transmission Mode A. The MS/UE further assumes for each CSI-RS port, the per-RB EPRE map follows the EPRE map in FIGS. 8A-8D and FIGS. 9A-9D associated with that type of subframe. In an exemplary embodiment, a MS/UE assumes the subframe type without a CSI-RS, but with a CRS in the PDSCH region for CQI/PMI estimation.

To implement the foregoing, Section 7.2.3 of 3GPP TS No. 36.213 may be modified so that the CQI reference resource is defined in the frequency domain by the group of downlink physical resource blocks corresponding to the band to which the derived CQI value relates. A downlink subframe would be considered to be valid if: 1) it is configured as a downlink subframe for that UE, 2) it is not an MBSFN subframe, 3) it does not contain a DwPTS field if the length of DwPTS is $7680T_S$ or less, 4) is does not fall within a configured measurement gap for that US; and 5) it does contain a CSI-RS. If there is no valid downlink subframe for the CQI reference resource, CQI reporting is omitted in uplink subframe n In another exemplary embodiment, a MS/UE assumes resource blocks (RBs) without a CSI-RS and without a CRS for CQI/PMI estimation. Note this type of subframe appears as a multicast-broadcast single frequency network (MBSFN) for Release 8 MSs/UEs, but could be used for unicast transmission for Release 10 and later releases. In other words, a downlink subframe is considered to be valid to be a CQI reference resource if the downlink subframe is an advanced (or Release 10) subframe without a CSI-RS. One motivation of this MS/UE assumption is that in some other systems, this type of RB is the most frequently occurring. In such a case, an MS/UE may further assume that the first two OFDM symbols are occupied by control signaling, instead of 3 OFDM symbols which had been a case for subframes with a CRS.

In a second advantageous embodiment of the disclosure, the BS/eNodeB signals to the MS/UE to indicate a specific type of subframe (a pre-determined SF type or default SF type) for CQI reference resource purposes. In one example, the number of states is limited to two subframe types without CSI-RS, and the signaling may be either MS-specific or cell-specific. The two states in this example are shown below in TABLE 3.

TABLE 3

| State Number | CQI reference resource |
| --- | --- |
| 0 | Subframes without CSI-RS and with CRS (or Rel-8 compatible subframe without CSI-RS) |
| 1 | Subframes without CSI-RS and without CRS (or an advanced (Rel-10) subframe without CSI-RS) |

The two-state signaling may be conveyed in a one-bit field in a higher layer.

In a third advantageous embodiment of the disclosure, a MS/UE assumes the presence of DM-RS in a default type subframe for the purpose of deriving the CQI index value. That is, the CQI index is calculated assuming that, in the CQI reference resource, the number and the position of DM-RS resource elements are known and taken into account in calculating CQI index by assuming these locations are occupied by user equipment reference signals (UE-RS).

In a fourth advantageous embodiment of the disclosure, for a system with a set of rank-dependent DM-RS patterns, the number and the location of DM-RS resource elements assumed for deriving the CQI index are dependent on the rank feedback (RI) at an MS/UE on which the CQI is conditioned. An MS/UE transmits a PUCCH report in the uplink to send control information to the BS/eNodeB. A PUCCH report may send CQI information or RI information, but not both. Thus, in the case of a periodic PUCCH report, the CQI calculation and report is conditioned on the RI value from the latest PUCCH report that contains an RI report.

An MS/UE normally transmits a PUSCH report in the uplink to send data information to the BS/eNodeB. However, a PUSCH report may sometimes send CQI information, RI information, or both to a BS/eNodeB by multiplexing the control information with the data information. Thus, in the case of a PUSCH report, the CQI calculation and report is conditioned on the RI value that accompanies the CQI in the same PUSCH report.

FIGS. 10A and 10B illustrate an example of rank-dependent EPRE mapping for the case of a subframe type without CSI-RS and with CRS in the PDSCH region. When an MS/UE estimates the transmission rank is less than or equal to 2, the MS/UE assumes the 12 resource element DM-RS pattern in FIG. 10B. When the MS/UE estimates the transmission rank is greater than or equal to 3, the MS/UE assumes the 24 resource element DM-RS pattern iii FIG. 10A.

To implement the foregoing, Section 7.2.3 of 3GPP TS No. 36.213 may be modified, for Release 10 or later transmission modes, so that, in the CQI reference resource, the MS/UE may assume the following for the purpose of deriving the CQI index: 1) the first 3 OFDM symbols are occupied by control signaling, 2) no resource elements are used by primary or secondary synchronization signals or PBCH, 3) the CP length of the non-MBSFN subframes, 4) redundancy version 0, 5) the PDSCH transmission scheme given by Table 7.2.3-0 depending on the transmission mode currently configured for the UE (which may be the default mode). In addition, if the estimated rank is less than or equal to 2, UE-specific RS REs for antenna ports 7 and 8 are occupied by UE-specific RS.

Also, if the estimated rank is greater than 2, UE-specific RS REs for antenna ports 7, 8, 9 and 10 are occupied by UE-specific RS.

In alternate embodiments, for a system with a set of rank-dependent DM-RS patterns, the base station (or eNodeB) may semi-statically configure a specific rank-dependent DM-RS pattern for the purpose of deriving the CQI index, or for the purpose of MS/UE demodulation, or both. In such a case, the specific DM-RS pattern determines the number and the location of the DM-RS resource elements that are assumed for CQI calculation.

In FIGS. 10A and 10B, an example of rank-dependent EPRE mapping is illustrated for the case of a subframe type without a CSI-RS resource element and with a CRS resource element in the PDSCH region. For example, the BS (or eNodeB) may configure the MS/UE to assume the DM-RS pattern (24 resource element pattern) in FIG. 10A for the purpose of deriving CQI index. The BS (or eNodeB) may also configure the MS/UE to assume the DM-RS pattern (12 resource pattern) in FIG. 10B for the purpose of deriving CQI index.

To implement the foregoing, Section 7.2.3 of 3GPP TS No. 36.213, may be modified, for Rel-10 or later transmission modes, so that in the CQI reference resource, the UE shall assume the following for the purpose of deriving the CQI index: 1) the first 3 OFDM symbols are occupied by control signaling, 2) no resource elements used by primary or secondary synchronization signals or PBCH, 3) CP length of the non-MBSFN subframes, 4) Redundancy Version 0, 5) the PDSCH transmission scheme given by Table 7.2.3-0 depending on the transmission mode currently configured for the UE (which may be the default mode), and 6) if a UE-specific RS pattern is signaled, the UE-specific RS pattern that is signaled to the UE by the eNB is occupied by UE-RS.

In alternate embodiments, for a transmission mode with a set of rank-dependent DM-RS patterns, one particular DM-RS pattern may be assumed for CQI calculation. By way of example, a transmission mode with two different DM-RS patterns, a rank-4 pattern and a rank-2 pattern, is shown in FIGS. 10A and 10B. Then, an MS/UE may calculate the CQI value assuming the DM-RS pattern in FIG. 10B, regardless of the transmission rank the MS/UE estimates.

To implement the foregoing, Section 7.2.3 of 3GPP TS No. 36.213 may be modified, for Release 10 or later transmission modes, so that, in the CQI reference resource, the UE shall assume the following for the purpose of deriving the CQI index: 1) the first 3 OFDM symbols are occupied by control signaling, 2) no resource elements used by primary or secondary synchronization signals or PBCH, 3) CP length of the non-MBSFN subframes, 4) Redundancy Version 0, 5) the PDSCH transmission scheme given by Table 7.2.3-0 depending on the transmission mode currently configured for the UE (which may be the default mode), and 6) if a UE is configured in a transmission mode with a set of rank-dependent DM RS patterns, UE-specific RS REs for antenna ports 7, 8, 9 and 10 are occupied by UE-specific RS.

CQI Definition for LTE Release 9 Mobile Stations:

FIG. 11 illustrates the DM-RS pattern for a 3GPP LTE system in Release 9. In Release 9, there is only one DM-RS pattern. Transmission mode 8 is defined for Release 9 LTE transmissions supporting dual-layer beamforming (up to rank 2 or a maximum of two streams for a MS/UE) and utilizing two DM-RS ports, namely, antenna ports 7 and 8. Mobile stations in transmission mode 8 use CRS resource elements to estimate CQI, PMI, and RI. Hence, CQI estimation uses the ratios of PDSCH EPRE to CRS EPRE, namely, $\rho_A$=A/P and $\rho_B$=B/P, where A, B and P are found in the EPRE map shown in FIG. 11. There are two modes of CQI reporting for transmission mode 8: 1) CQI reporting mode 1—TxD-based CQI without PMI/RI reporting, and 2) CQI reporting mode 2 CQI reporting based on closed-loop spatial multiplexing with PMI/RI reporting configured.

When CQI reporting I is configured, where I=1 or 2, the MS/UE may exclude DM-RS resource elements for CQI calculation. To implement the foregoing, Section 7.2.3 of 3GPP TS No. 36.213 may be modified for transmission mode 8 so that, in the CQI reference resource, the UE shall assume the following for the purpose of deriving the CQI index: 1) the first 3 OFDM symbols are occupied by control signaling, and 2) for a UE in transmission mode 8, the UE-specific RS pattern as defined for antenna port 7 and 8 in non-DwPTS subframe are occupied for UE-RS.

Alternative, we apply this condition for CQI calculation to the UE configured with RI/PMI reporting. To implement the foregoing, Section 7.2.3 of 3GPP TS No. 36.213 may be modified so that in the CQI reference resource, the MS/UE may assume the following for the purpose of deriving the CQI index: 1) the first 3 OFDM symbols are occupied by control signaling, and 2) for a UE in transmission mode 8 configured with PMI/CQI reporting, the UE-specific RS pattern as defined for antenna port 7 and 8 in non-DwPTS subframes are occupied for UE-RS.

Figure 12A:
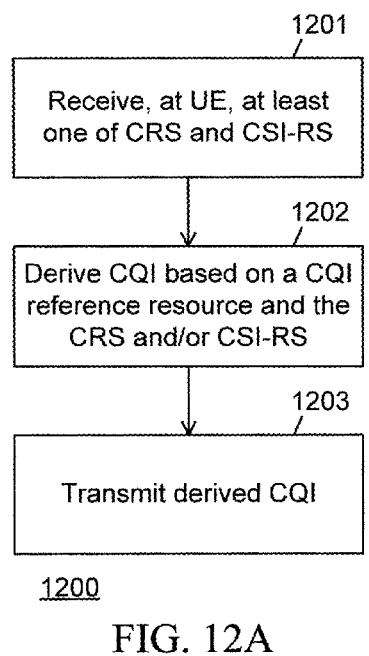
FIGS. 12A and 12B are high level flowcharts illustrating processes for deriving a channel quality indicator in accordance with embodiments of the present disclosures.

FIG. 12A is a high level flowchart illustrating a process for deriving a channel quality indicator in accordance with an embodiment of the present disclosure. The process 1200 is executed within a UE, and begins with receiving at the UE at least one of a CSI and a CSI-RS (step 1201). CQI is derived at the UE based on a CQI reference resource and one or both of the CRS and CSI-RS (step 1202). The derived CQI is transmitted by the UE (step 1203).

Figure 12B:
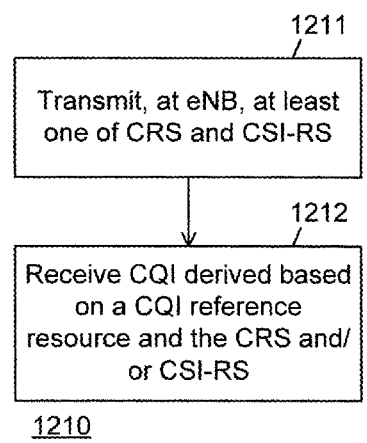

FIG. 12B is a high level flowchart illustrating processes for obtaining a derived channel quality indicator in accordance with an embodiment of the present disclosure. The process 1210 is executed within an eNB, and begins with transmitting from the eNB at least one of a CRS and a CSI-RS (step 1211). A CQI derived based on a CQI reference resource and one or both of the CRS and the CSI-RS is received at the eNB (step 1212).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for deriving Channel Quality Indicator (CQI) in a communication system, the method comprising:
  receiving, at a User Equipment (UE), at least one of a cell-specific reference signal (CRS) or a channel-state-information reference signal (CSI-RS);
  deriving a CQI based on a channel state information reference resource and the at least one of the CRS or the CSI-RS; and
  transmitting the CQI to an enhanced Node B (eNB),
  wherein the channel state information reference resource is defined by a downlink subframe type and a group of downlink physical resource blocks corresponding to a band to which the derived CQI value relates.

2. The method of claim 1, wherein the UE is configured to assume that, in the channel state information reference resource, a demodulation reference signal (DMRS) pattern consistent with a most recent reported rank.

3. The method of claim 2, wherein, when the UE is configured for precoding matrix indicator/rank indicator (PMI/RI) reporting, the UE is configured to determine that the DMRS pattern is consistent with most recent reported rank.

4. The method of claim 2, wherein, when the most recent reported rank is less than or equal to 2, the DMRS pattern includes resource elements (REs) for antenna ports 7 and 8.

5. The method of claim 2, wherein, when the most recent reported rank is greater than 2, the DMRS pattern includes REs for antenna ports 7, 8, 9 and 10.

6. The method of claim 1, wherein the UE is configured to assume that no REs are allocated for CSI-RS in the channel state information reference resource.

7. The method of claim 1, wherein the downlink subframe is considered to be a valid downlink subframe.

8. The method of claim 7, wherein the downlink subframe is considered to be valid when:
 the downlink subframe is configured as a downlink subframe for the UE,
 the downlink subframe is not an Multicast broadcast single frequency network (MBSFN) subframe,
 the downlink subframe does not contain a Downlink Pilot Time Slot (DwPTS) field in case the length of DwPTS is 7680 TS or less, and
 the downlink subframe is does not fall within a configured measurement gap for the UE.

9. The method of claim 1, wherein deriving the CQI comprises deriving the CQI conditioned on the most recent reported rank.

10. A method for receiving a Channel Quality Indicator (CQI) in a communication system, the method comprising:
 transmitting, by an enhanced Node B (eNB), at least one of a cell-specific reference signal (CRS) or a channel-state-information reference signal (CSI-RS); and
 receiving a CQI derived based on a channel state information reference resource from a User Equipment (UE) and the at least one of the CRS or the CSI-RS,
 wherein the channel state information reference resource is defined by a downlink subframe type and a group of downlink physical resource blocks corresponding to the band to which the derived CQI value relates.

11. The method of claim 10, wherein the UE is configured to assume that, in the channel state information reference resource, a demodulation reference signal (DMRS) pattern is consistent with a most recent reported rank.

12. The method of claim 11, wherein, when the UE is configured for precoding matrix indicator/rank indicator (PMI/RI) reporting, the UE is configured to assume that the DMRS pattern is consistent with most recent reported rank.

13. The method of claim 11, wherein, when the most recent reported rank is less than or equal to 2, the DMRS pattern includes resource elements (REs) for antenna ports 7 and 8.

14. The method of claim 11, wherein, when the most recent reported rank is greater than 2, the DMRS pattern includes REs for antenna ports 7, 8, 9 and 10.

15. The method of claim 10, wherein the UE is configured to assume that no REs are allocated for CSI-RS in the channel state information reference resource.

16. The method of claim 10, wherein the downlink subframe is considered to be a valid downlink subframe.

17. The method of claim 16, wherein the downlink subframe is considered to be valid when:
 the downlink subframe is configured as a downlink subframe for the UE,
 the downlink subframe is not an Multicast broadcast single frequency network (MBSFN) subframe,
 the downlink subframe does not contain a Downlink Pilot Time Slot (DwPTS) field in case the length of DwPTS is 7680 TS or less, and
 the downlink subframe is does not fall within a configured measurement gap for the UE.

18. The method of claim 10, wherein the derived CQI is derived as a function of a most recent reported rank.

19. A User Equipment (UE) configured to derive a Channel Quality Indicator (CQI) in a communication system, the UE comprising:
 a receiver configured to receive at least one of a cell-specific reference signal (CRS) and or a channel-state-information reference signal (CSI-RS);
 a controller configured to derive CQI based on a channel state information reference resource and the at least one of the CRS or the CSI-RS; and
 a transmitter configured to transmit the CQI to an enhanced Node B (eNB),
 wherein the channel state information reference resource is defined by a group of downlink physical resource blocks corresponding to the band to which the derived CQI value relates, and a downlink subframe type.

20. The UE of claim 19, wherein the controller is configured to assume that a demodulation reference signal (DMRS) pattern is consistent with a most recent reported rank.

21. The UE of claim 20, wherein, when the UE is configured for precoding matrix indicator/rank indicator (PMI/RI) reporting, the controller is configured to determine that the DMRS pattern is consistent with most recent reported rank.

22. The UE of claim 20, wherein the most recent reported rank is less than or equal to 2, the DMRS pattern includes resource elements (REs) for antenna ports 7 and 8.

23. The UE of claim 20, wherein the most recent reported rank is greater than 2, the DMRS pattern includes REs for antenna ports 7, 8, 9 and 10.

24. The UE of claim 19, wherein the controller is configured to assume that no REs are allocated for CSI-RS.

25. The UE of claim 19, wherein the downlink subframe is considered to be a valid downlink subframe.

26. The UE of claim 25, wherein the downlink subframe is considered to be valid when:
 the downlink subframe is configured as a downlink subframe for the UE,
 the downlink subframe is not an Multicast broadcast single frequency network (MBSFN) subframe,
 the downlink subframe does not contain a Downlink Pilot Time Slot (DwPTS) field in case the length of DwPTS is 7680 TS or less, and
 the downlink subframe is does not fall within a configured measurement gap for the UE.

27. The UE of claim 19, wherein the controller is configured to derive the CQI conditioned on a most recent reported rank.

28. An enhanced Node B (eNB) configured to receive a Channel Quality Indicator (CQI) in a communication system, the eNB comprising:
 transmitter configured to transmit at least one of a cell-specific reference signal (CRS) or a channel-state-information reference signal (CSI-RS); and
 receiver configured to receive a CQI derived based on a channel state information reference resource from a User Equipment (UE) and the at least one of the CRS or the CSI-RS,
 wherein the channel state information reference resource is defined by a downlink subframe type and a group of downlink physical resource blocks corresponding to the band to which the derived CQI value relates.

29. The eNB of claim 28, wherein the UE is configured to assume that, in the channel state information reference resource, a demodulation reference signal (DMRS) pattern is consistent with a most recent reported rank.

30. The eNB of claim 29, wherein, when the UE is configured for precoding matrix indicator/rank indicator (PMI/RI) reporting, the UE is configured to assume that the DMRS pattern is consistent with most recent reported rank.

31. The eNB of claim 29, wherein, when the most recent reported rank is less than or equal to 2, the DMRS pattern includes resource elements (REs) for antenna ports 7 and 8.

32. The eNB of claim 29, wherein, when the most recent reported rank is greater than 2, the DMRS pattern includes REs for antenna ports 7, 8, 9 and 10.

33. The eNB of claim 28, wherein the UE is configured to assume that no Resource Elements (REs) are allocated for CSI-RS in the channel state information reference resource.

34. The eNB of claim 28, wherein the downlink subframe is considered to be a valid downlink subframe.

35. The eNB of claim 34, wherein the downlink subframe is considered to be valid when:
- the downlink subframe is configured as a downlink subframe for the UE,
- the downlink subframe is not an Multicast broadcast single frequency network (MBSFN) subframe,
- the downlink subframe does not contain a Downlink Pilot Time Slot (DwPTS) field in case the length of DwPTS is 7680 TS or less, and
- the downlink subframe is does not fall within a configured measurement gap for the UE.

36. The eNB of claim 28, wherein the derived CQI is derived as a function of a most recent reported rank.

* * * * *